United States Patent
Kitazato et al.

(10) Patent No.: US 9,432,744 B2
(45) Date of Patent: Aug. 30, 2016

(54) RECEIVING DEVICE, RECEIVING METHOD, TRANSMITTING DEVICE, AND TRANSMITTING METHOD

(71) Applicant: Sony Corporation, Tokyo (JP)

(72) Inventors: Naohisa Kitazato, Tokyo (JP); Yasuaki Yamagishi, Kanagawa (JP); Yoshiharu Dewa, Tokyo (JP); Jun Kitahara, Saitama (JP); Mark Eyer, Woodinville, WA (US)

(73) Assignee: SONY CORPORATION, Tokyo (JP)

( * ) Notice: Subject to any disclaimer, the term of this patent is extended or adjusted under 35 U.S.C. 154(b) by 290 days.

(21) Appl. No.: 13/777,693

(22) Filed: Feb. 26, 2013

(65) Prior Publication Data

US 2014/0040965 A1     Feb. 6, 2014

Related U.S. Application Data

(60) Provisional application No. 61/677,752, filed on Jul. 31, 2012.

(51) Int. Cl.
   *H04N 7/173*          (2011.01)
   *H04N 21/81*          (2011.01)

(52) U.S. Cl.
   CPC ....... *H04N 21/8126* (2013.01); *H04N 21/8166* (2013.01)

(58) Field of Classification Search
   CPC .................................................. H04N 21/4586
   See application file for complete search history.

(56) References Cited

U.S. PATENT DOCUMENTS

| 6,571,392 | B1* | 5/2003 | Zigmond et al. ............... 725/110 |
| 2002/0056129 | A1* | 5/2002 | Blackketter ............... H04N 5/44 725/112 |
| 2003/0051252 | A1 | 3/2003 | Miyaoku et al. |
| 2006/0236334 | A1 | 10/2006 | Luccisano et al. |
| 2007/0204293 | A1* | 8/2007 | Hamada .......................... 725/37 |
| 2010/0186060 | A1* | 7/2010 | Luccisano et al. ............ 725/116 |
| 2011/0075990 | A1 | 3/2011 | Eyer |
| 2011/0088075 | A1 | 4/2011 | Eyer |

(Continued)

FOREIGN PATENT DOCUMENTS

| JP | 2007/116717 | 5/2007 |
| JP | 2011-066556 | 3/2011 |

(Continued)

OTHER PUBLICATIONS

U.S. Appl. No. 61/668,442, filed Jul. 5, 2012.*

(Continued)

*Primary Examiner* — Junior Mendoza
(74) *Attorney, Agent, or Firm* — Oblon, McClelland, Maier & Neustadt, L.L.P.

(57) ABSTRACT

Disclosed herein is a receiving device including: a receiver that receives AV content; a trigger information acquirer that acquires trigger information adapted to identify control information to control operation of an application program run in conjunction with the AV content; a table acquirer that acquires a table in which the control information identified by the trigger information is stored in response to first version information that is included in the trigger information and indicates a version of the table; and a control section that controls the operation of the application program in response to the control information that is identified by the trigger information and is stored in the table.

11 Claims, 18 Drawing Sheets

(56) References Cited

U.S. PATENT DOCUMENTS

| | | |
|---|---|---|
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1* | 3/2012 | Dewa .......................... 725/132 |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0189010 A1* | 7/2012 | Lee et al. ..................... 370/392 |
| 2012/0236933 A1 | 9/2012 | Saitoh et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Kitazato et al. |
| 2013/0036440 A1 | 2/2013 | Eyer |
| 2013/0347030 A1* | 12/2013 | Oh et al. .......................... 725/32 |

FOREIGN PATENT DOCUMENTS

| | | |
|---|---|---|
| JP | 2011-124690 A | 6/2011 |
| JP | 2011-124690 A5 | 6/2011 |
| JP | 2012-70351 | 4/2012 |

OTHER PUBLICATIONS

International Search Report issued Oct. 1, 2013, in International Application No. PCT/JP2013/069779 (with English translation).
U.S. Appl. No. 13/562,946, filed Jul. 31, 2012, Eyer.
U.S. Appl. No. 13/559,188, filed Jul. 26, 2012, Kitazato.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/648,753, filed Oct. 10, 2012, Yamagishi.
U.S. Appl. No. 13/679,624, filed Nov. 16, 2012, Yamagishi.
U.S. Appl. No. 13/708,313, Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
Extended European Search Report issued Feb. 10, 2016 in European Patent Application No. 13825085.7.

* cited by examiner

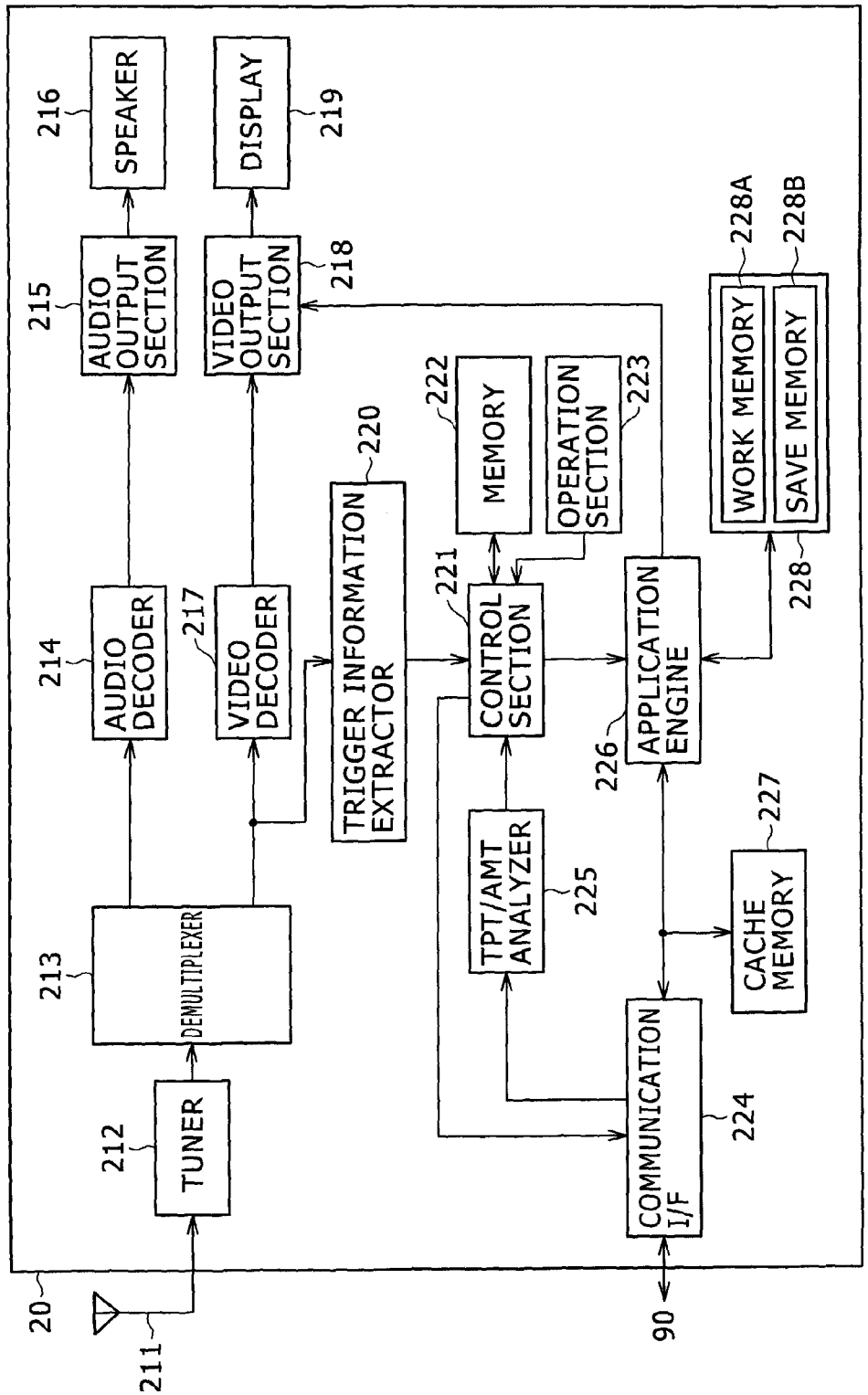

FIG. 4

| item | description |
|---|---|
| domain_name | The domain name of the provider's server (which TPT files are located) |
| segment_id | The unique name for the target segment. Provider can define it freely. |
| media_time | The time stamp of the target time position of the segment. |
| event_id | The ID for broadcast event related with any action for App control. |
| event_time | The target time for the broadcast event measured by media_time |
| spread | Randomized diffusion range of trigger action timing |
| version | Version of TPT |

FIG. 5

```
<domain_name>/<segment_id>
<domain_name>/<segment_id>?m=<media_time>
<domain_name>/<segment_id>?m=<media_time>&s=<spread>
<domain_name>/<segment_name>?e=<event_id>
<domain_name>/<segment_name>?e=<event_id>&s=<spread>
<domain_name>/<segment_name>?e=<event_id>&t=<event_time>
<domain_name>/<segment_name>?e=<event_id>&t=<event_time>&s=<spread>
<domain_name>/<segment_name>?v=<version>
```

FIG. 6

| Element/Attribute (with @) | No. permitted | Description & Value |
|---|---|---|
| TPT | | |
| @protocolVersion | 1 | Protocol version, major/minor |
| @id | 1 | domain_name/program_id = segment_id |
| @tptVersion | 1 | Data version of this TPT |
| @updatingTime | 0..1 | Recommended TPT polling interval |
| @expireDate | 0..1 | Date after which this TPT will not be used |
| @serviceId | 0..1 | NRT service_id |
| @baseURL | 0..1 | Base URL for all relative URLs in TPT |
| Capabilities | 0..1 | Essential capabilities for this segment |
| LiveTrigger | 0..1 | Information about live trigger delivery |
|   @URL | 1 | URL of server for live Triggers |
|   @deliveryType | 1 | Streaming\|long polling\|short polling |
|   @pollPeriod | 0..1 | Short polling period in seconds |
| Application | 1..N | Application for this segment |
|   @appID | 1 | Application ID, for reference by trigger |
|   @appType | 0..1 | Application type (default="App") |
|   @appName | 0..1 | Displayable name (for viewer consent) |
|   @globalId | 0..1 | Globally unique app ID |
|   @appVersion | 0..1 | Version of this app |
|   @testApp | 0..1 | Flag for test App; default="false" |
|   @cookieSpace | 1 | Bytes of persistent storage needed |
|   @frequencyOfUse | 0..1 | 1 hr, 1 day, etc. (for caching guidance) |
|   @frequencyOfUpdate | 0..1 | 1 hr, 1 day, etc. (for caching guidance) |
|   @expireDate | 0..1 | Expire date for caching |
|   @availInternet | 0..1 | Default="true" |
|   @availBroadcast | 0..1 | Default="true" |
|   URL | 1..N | App URL(s) -- first URL is entry point |
|   Capabilities | 0..1 | Essential capabilities to present this App |
|   ContentItem | 0..N | Content item used by this App |
|     URL | 1..N | URL(s) of content items |
|     updatesAvail | 0..1 | Default="false" |
|     Size | 0..1 | Size of content item, in kilobytes |
|   Event | 1..N | Event targeted to this App |
|     @eventId | 1 | Event ID, for reference by trigger |
|     @destination | 0..1 | Targeted device type, e.g., HDTV, SDTV, external_1, external_2, etc. |
|     @action | 1 | "register", etc. |
|     @diffusion | 0..1 | Period for applying diffusion, in seconds |
|     data | 0..1 | Data to be used by this App for stream-event |

FIG. 7

| Element/Attribute (with @) | No. permitted | Description & Value |
|---|---|---|
| AMT | | |
| @protocolVersion | 1 | Protocol version, major/minor |
| @segmentId | 1 | domain_name/program_id = segment id |
| @beginMT | 1 | Start time of this segment time scope |
| Activation | 1..N | Activation message |
| @targetId | 1 | Identifies target event in form appId+eventId |
| @startTime | 1 | Start time of action period |
| @endTime | 0..1 | End time of action period |

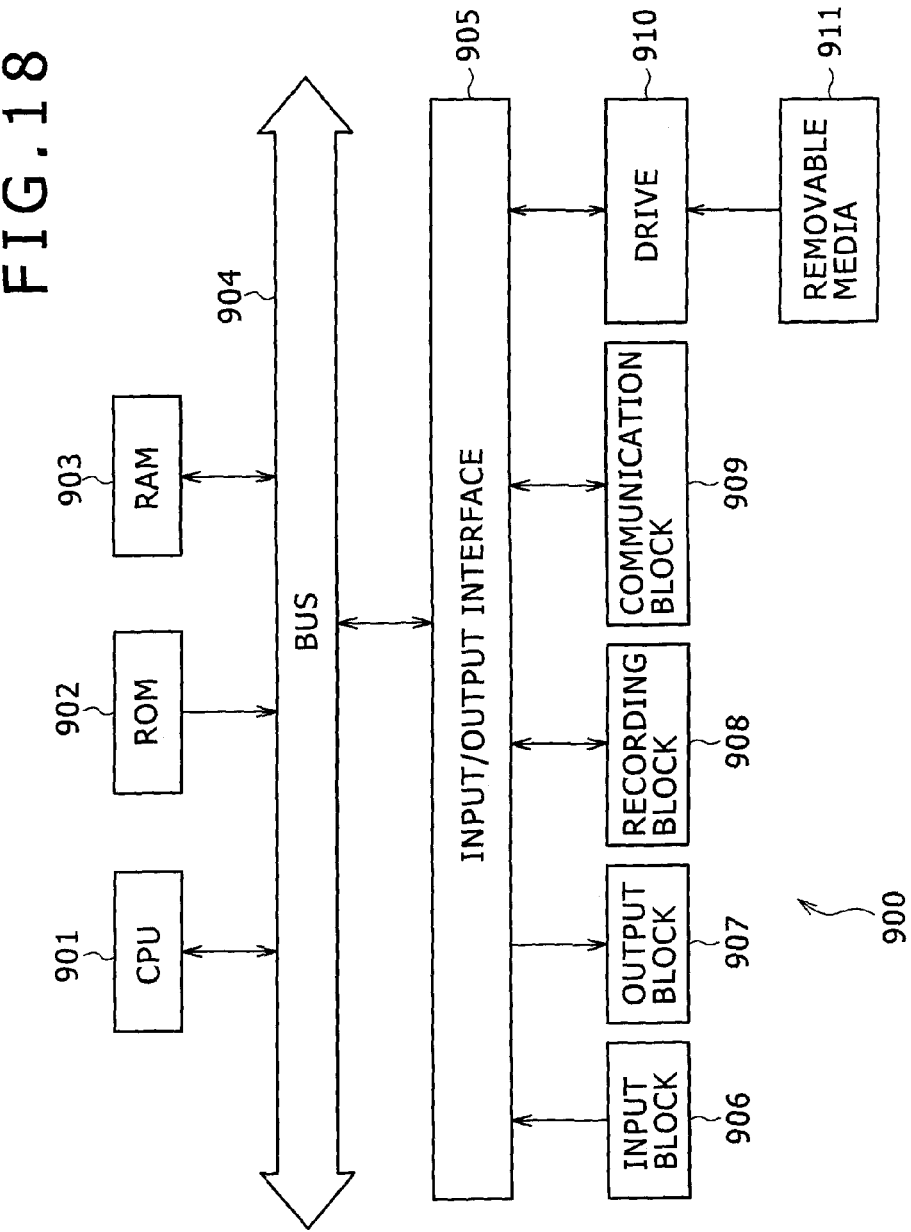

RECEIVING DEVICE, RECEIVING METHOD, TRANSMITTING DEVICE, AND TRANSMITTING METHOD

CROSS-REFERENCE TO RELATED APPLICATION

This application claims the benefit of priority of Provisional Application Ser. No. 61/677,752, filed Jul. 31, 2012, the entire contents of which is incorporated herein by reference.

BACKGROUND

The present disclosure relates to receiving devices, receiving methods, transmitting devices, and transmitting methods and particularly to a receiving device, a receiving method, a transmitting device, and a transmitting method that can properly retain a table in which control information of an application program run in conjunction with AV (audio video) content is stored.

In recent years, in the field of digital broadcast, introduction of not only a service utilizing a broadcast but a cooperative service that cooperates with the Internet is predicted (for example, refer to Japanese Patent Laid-open No. 2011-66556). In such a cooperative service of broadcast and communication, an application program delivered by the Internet can be run in conjunction with broadcast content of a television show etc.

SUMMARY

In a case in which the above-described application program is operated in a receiving device that receives broadcast content, a table in which control information adapted to control the operation is stored is used in some cases.

In this case, it is required for this table to be properly retained in order to make the broadcast content and the application program properly operate in conjunction with each other in the receiving device.

The present disclosure is devised in view of such circumstances, and it is desirable to allow proper retention of a table in which control information of an application program run in conjunction with AV content such as broadcast content is stored.

A receiving device of a first embodiment of the present disclosure includes a receiver that receives AV content, and a trigger information acquirer that acquires trigger information adapted to identify control information to control operation of an application program run in conjunction with the AV content. The receiving device further includes a table acquirer that acquires a table in which the control information identified by the trigger information is stored in response to first version information that is included in the trigger information and indicates a version of the table, and a control section that controls the operation of the application program in response to the control information that is identified by the trigger information and is stored in the table.

The receiving device may be an independent device or may be an internal block configuring one device.

A receiving method of the first embodiment of the present disclosure is a receiving method corresponding to the receiving device of the first embodiment of the present disclosure.

In the receiving device and the receiving method of the first embodiment of the present disclosure, the AV content is received and the trigger information adapted to identify the control information to control the operation of the application program run in conjunction with the AV content is acquired. The table in which the control information identified by the trigger information is stored is acquired in response to the first version information that is included in the trigger information and indicates the version of the table, and the operation of the application program is controlled in response to the control information that is identified by the trigger information and is stored in the table.

A transmitting device of a second embodiment of the present disclosure includes a trigger information generator that generates trigger information that is adapted to identify control information to control operation of an application program run in conjunction with AV content and includes version information indicating a version of a table in which the control information identified by the trigger information is stored, and a transmitter that transmits the trigger information together with the AV content.

The transmitting device may be an independent device or may be an internal block configuring one device.

A transmitting method of the second embodiment of the present disclosure is a transmitting method corresponding to the transmitting device of the second embodiment of the present disclosure.

In the transmitting device and the transmitting method of the second embodiment of the present disclosure, the trigger information that is adapted to identify the control information to control the operation of the application program run in conjunction with the AV content and includes the version information indicating the version of the table in which the control information identified by the trigger information is stored is generated, and the trigger information is transmitted together with the AV content.

According to the first embodiment and the second embodiment of the present disclosure, the table in which the control information of the application program run in conjunction with the AV content is stored can be properly retained.

BRIEF DESCRIPTION OF THE DRAWINGS

FIG. 3 is a diagram showing a configuration example of a receiving device;

FIG. 4 is a diagram showing a detailed configuration of trigger information;

FIG. 5 is a diagram showing a description example of the trigger information;

FIG. 6 is a diagram showing a detailed configuration of a TPT (trigger parameters table);

FIG. 7 is a diagram showing a detailed configuration of an AMT (activation messages table);

FIG. 18 is a diagram showing a configuration example of a computer.

DETAILED DESCRIPTION OF THE PREFERRED EMBODIMENTS

Embodiments of the present disclosure will be described below with reference to the drawings.

<First Embodiment>

[Configuration Example of Broadcast-Communication Cooperative System]

Figure 1:
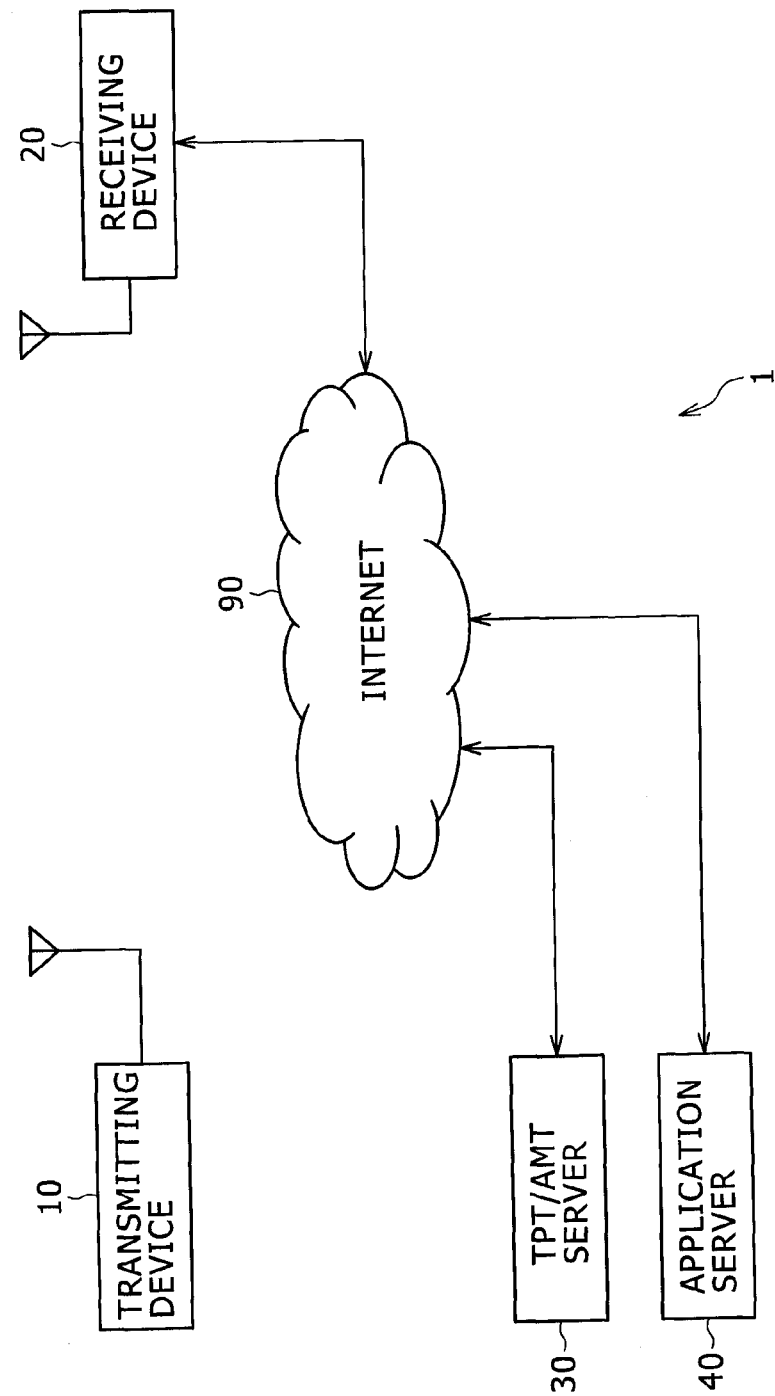
FIG. 1 is a diagram showing a configuration example of a broadcast-communication cooperative system.

FIG. 1 shows a broadcast-communication cooperative system 1. This broadcast-communication cooperative system 1 includes a transmitting device 10, a receiving device 20, a TPT/AMT server 30, and an application server 40.

The receiving device 20, the TPT/AMT server 30, and the application server 40 are connected to each other via the Internet 90.

The transmitting device 10 transmits (broadcasts) broadcast content of television show, CM (commercial message), etc. by a digital television broadcast signal (hereinafter, referred to simply as broadcast signal). The transmitting device 10 is provided by a broadcaster and is disposed in the broadcast station thereof for example.

The transmitting device 10 transmits trigger information adapted to identify control information to control the operation of a conjunction application, with the trigger information included in the broadcast signal. Here, the conjunction application is an application program run in conjunction with broadcast content.

The receiving device 20 receives the broadcast signal transmitted from the transmitting device 10 and acquires video and audio of the broadcast content. The receiving device 20 displays the video of the broadcast content on a display and outputs the audio from a speaker.

Hereinafter, the description will be made based on the assumption that the receiving device 20 is a television receiver. However, it is not limited thereto. For example, a receiving device may be included in electronic apparatus such as a video recorder by adopting a configuration that does not have a display and a speaker.

If trigger information from the transmitting device 10 is extracted, the receiving device 20 sets or resets (calibrates) the time of an internal clock based on time information included in this trigger information. Hereinafter, this internal clock will be referred to as media clock. In response to the trigger information from the transmitting device 10, the receiving device 20 accesses the TPT/AMT server 30 via the Internet 90 to acquire a TPT and an AMT.

The TPT/AMT server 30 manages the TPT and the AMT. The TPT/AMT server 30 is provided by a broadcaster or another provider.

Here, the TPT is a table configured to identify an action specified by an event for a conjunction application. For example, in the TPT, ID (identification data) adapted to identify an event for a conjunction application and an action specified by this event are associated.

The AMT is a table configured to indicate the time at which an action for a conjunction application should be executed. For example, in the AMT, ID adapted to identify an event for a conjunction application and a valid period of each ID are associated. However, the valid period of the event is determined in matching with the progression of broadcast content.

That is, the action that should be executed at predetermined timing and is for the specified conjunction application is identified by the TPT and the AMT.

The TPT/AMT server 30 provides a TPT and an AMT via the Internet 90 in response to a query from the receiving device 20.

The receiving device 20 refers to the TPT and the AMT based on the media clock to thereby identify the action for the specified conjunction application. Then, the receiving device 20 controls the operation of the specified conjunction application in response to the identified action.

In response to the identified action, the receiving device 20 accesses the application server 40 via the Internet 90 to acquire a conjunction application.

The application server 40 manages the conjunction application. The application server 40 is provided by a broadcaster or another provider.

The application server 40 provides the conjunction application via the Internet 90 in response to a query from the receiving device 20.

In FIG. 1, only one receiving device 20 is shown for simplification of explanation. However, actually the broadcast-communication cooperative system 1 includes plural receiving devices 20 and these receiving devices 20 receive broadcast content from the transmitting device 10.

Similarly, one TPT/AMT server 30 and one application server 40 are shown in FIG. 1. However, actually plural TPT/AMT servers 30 and application servers 40 are provided for each broadcaster and the receiving device 20 accesses any of them depending on trigger information and information specified by a TPT and an AMT.

The broadcast-communication cooperative system 1 is configured in the above-described manner.

[Configuration Example of Transmitting Device]

Figure 2:
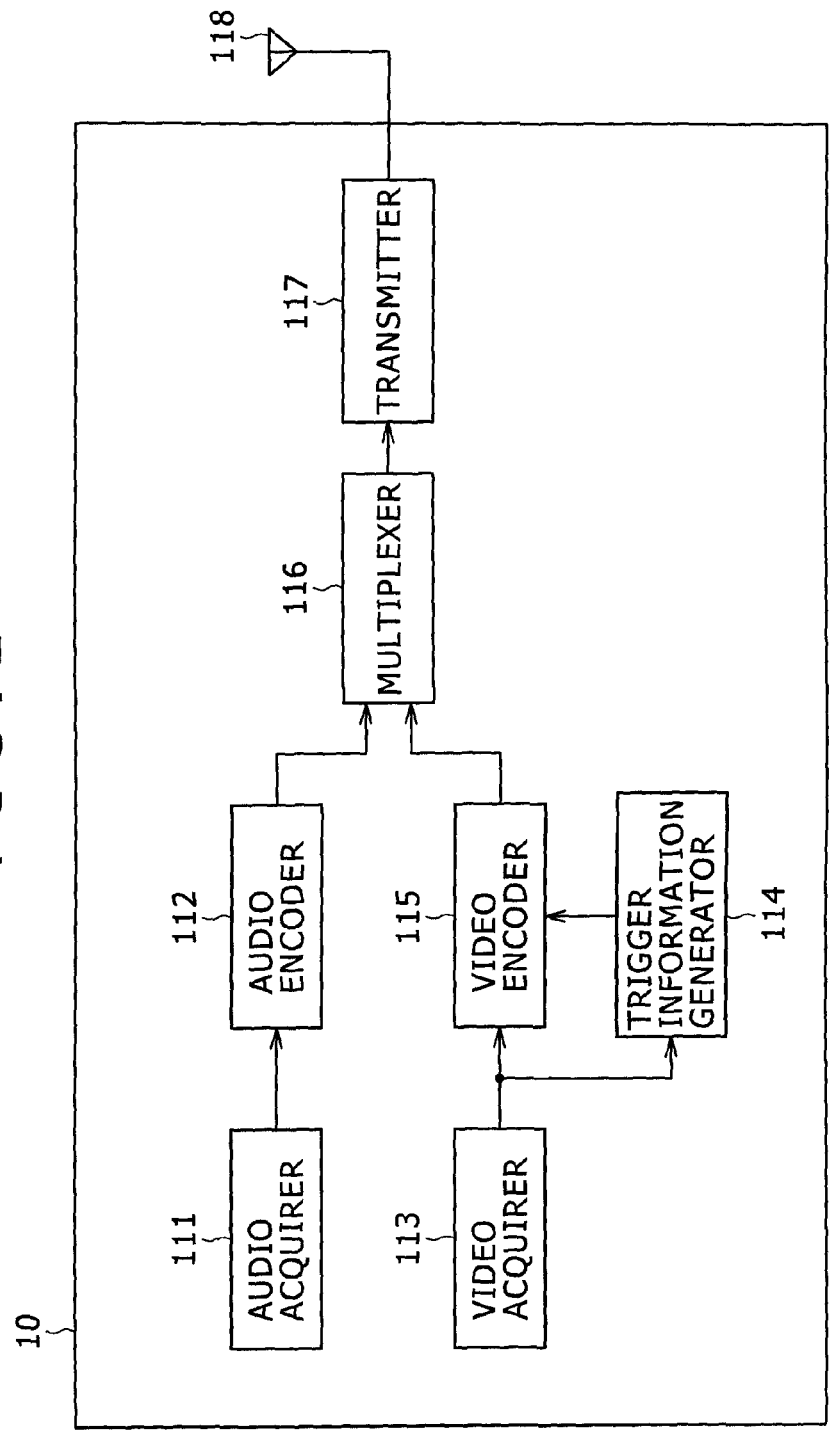
FIG. 2 is a diagram showing a configuration example of a transmitting device.

FIG. 2 shows a configuration example of the transmitting device 10 in FIG. 1.

As shown in FIG. 2, the transmitting device 10 includes an audio acquirer 111, an audio encoder 112, a video acquirer 113, a trigger information generator 114, a video encoder 115, a multiplexer 116, and a transmitter 117.

The audio acquirer 111 acquires an audio signal of broadcast content from an external server, microphone, recording medium, or so forth and supplies it to the audio encoder 112.

The audio encoder 112 encodes the audio signal supplied from the audio acquirer 111 in accordance with an encoding system such as the MPEG (moving picture experts group) 2 and supplies an audio stream obtained as the result to the multiplexer 116.

The video acquirer 113 acquires a video signal of broadcast content from an external server, camera, recording medium, or so forth and supplies it to the trigger information generator 114 and the video encoder 115.

The trigger information generator 114 generates trigger information and supplies it to the video encoder 115. For example, the trigger information is generated depending on the progression of the broadcast content corresponding to the video signal supplied from the video acquirer 113.

The video encoder 115 encodes the video signal supplied from the video acquirer 113 in accordance with an encoding system such as the MPEG2.

The video encoder 115 also disposes the trigger information in a video stream obtained by the encoding. For example, the trigger information is disposed in subtitle data in a user data area of the video stream.

The video stream including the trigger information is supplied to the multiplexer 116.

The multiplexer 116 multiplexes the audio stream from the audio encoder 112 and the video stream from the video encoder 115 and supplies a transport stream obtained as the result to the transmitter 117.

The transmitter 117 transmits the transport stream supplied from the multiplexer 116 as a broadcast signal via an antenna 118.

The transmitting device 10 is configured in the above-described manner.

[Configuration Example of Receiving Device]

FIG. 3 shows a configuration example of the receiving device 20 in FIG. 1.

As shown in FIG. 3, the receiving device 20 includes a tuner 212, a demultiplexer 213, an audio decoder 214, an audio output section 215, a speaker 216, a video decoder 217, a video output section 218, and a display 219.

In the receiving device 20, a trigger information extractor 220, a control section 221, a memory 222, an operation section 223, a communication I/F (interface) 224, a TPT/AMT analyzer 225, an application engine 226, a cache memory 227, and an application memory 228 are also included in order to operate a conjunction application.

The tuner 212 demodulates a broadcast signal received via an antenna 211 and supplies a transport stream obtained as the result to the demultiplexer 213.

The demultiplexer 213 separates the transport stream supplied from the tuner 212 into an audio stream and a video stream and supplies the audio stream to the audio decoder 214 and the video stream to the video decoder 217.

The audio decoder 214 decodes the audio stream supplied from the demultiplexer 213 by a decoding system corresponding to the encoding system, such as the MPEG2, by the audio encoder 112 (FIG. 2) and supplies an audio signal obtained as the result to the audio output section 215.

The audio output section 215 supplies, to the speaker 216, the audio signal supplied from the audio decoder 214. The speaker 216 outputs audio corresponding to the audio signal supplied from the audio output section 215.

The video decoder 217 decodes the video stream supplied from the demultiplexer 213 by a decoding system corresponding to the encoding system, such as the MPEG2, by the video encoder 115 (FIG. 2) and supplies a video signal obtained as the result to the video output section 218.

The video output section 218 supplies, to the display 219, the video signal supplied from the video decoder 217. The display 219 displays video corresponding to the video signal supplied from the video output section 218.

The trigger information extractor 220 always monitors the video stream separated by the demultiplexer 213. The trigger information extractor 220 extracts (acquires) the trigger information disposed in the video stream and supplies it to the control section 221.

The control section 221 runs a control program stored in the memory 222 in advance to thereby control the operation of the respective sections of the receiving device 20.

The operation section 223 accepts various kinds of operation from a user and notifies the control section 221 of an operation signal corresponding thereto. The control section 221 controls the operation of the respective sections of the receiving device 20 in response to the operation signal from the operation section 223.

In response to the trigger information supplied from the trigger information extractor 220, the control section 221 controls the communication I/F 224 to access the TPT/AMT server 30 via the Internet 90 and request a TPT and an AMT.

The communication I/F 224 receives the TPT and the AMT transmitted from the TPT/AMT server 30 and supplies it to the TPT/AMT analyzer 225 in accordance with control from the control section 221.

The TPT/AMT analyzer 225 acquires and retains the TPT and the AMT supplied from the communication I/F 224. The TPT/AMT analyzer 225 analyzes the TPT and the AMT and supplies the analysis result to the control section 221.

The control section 221 sets or resets (calibrates) the media clock based on time information included in the trigger information supplied from the trigger information extractor 220.

Based on the time indicated by the media clock, the control section 221 refers to the analysis result of the TPT and the AMT from the TPT/AMT analyzer 225 to identify an action for the specified conjunction application. For example, when a predetermined valid condition is satisfied, such as when the time indicated by the media clock first reaches the valid period of an event, the control section 221 identifies the action corresponding to this valid event.

If an ID adapted to identify the event for the specified conjunction application is included in the trigger information from the transmitting device 10, the control section 221 refers to the analysis result of the TPT and the AMT and identifies the action that corresponds to this ID and is for the conjunction application.

In response to the identified action, the control section 221 controls the application engine 226 to control the operation of the conjunction application.

The application engine 226 controls the communication I/F 224 to access the application server 40 via the Internet 90 and request a conjunction application in accordance with control from the control section 221. The communication I/F 224 receives the conjunction application transmitted from the application server 40 and makes it be retained in the cache memory 227.

The application engine 226 reads out the conjunction application retained in the cache memory 227 and runs it in accordance with control from the control section 221. A video signal of the running conjunction application is supplied to the video output section 218.

The video output section 218 combines the video signal supplied from the application engine 226 with the video signal supplied from the video decoder 217 and makes the display 219 display video obtained by this.

The application memory 228 includes a work memory 228A and a save memory 228B. The application engine 226 records data relating to the running conjunction application in the work memory 228A.

When causing the running conjunction application to pause, the application engine 226 moves the data in the work memory 228A of the application memory 228 to the save memory 228B. Then, when resuming the conjunction application in the pause, the application engine 226 moves the data in the save memory 228B to the work memory 228A to restore the state before the pause.

The receiving device 20 is configured in the above-described manner.

[Detailed Configuration of Trigger Information]

Next, a detailed configuration of the trigger information will be described.

(Detailed Specification of Trigger Information)

FIG. 4 is a diagram showing the detailed specification of the trigger information.

The trigger information includes domain_name, segment_id, media_time, event_id, event_time, spread, and version.

In domain_name, information indicating a domain name adapted to identify a predetermined server is specified. For example, in domain_name, the domain name corresponding to a name of a provider that provides the TPT/AMT server 30 is specified.

In segment_id, an ID adapted to identify a segment (specific interval) of broadcast content is specified. The provider can specify an arbitrary ID.

In media_time, information indicating a specific time position on a progression time axis of the broadcast content is specified. For example, a specific time such as a start time on the progression time axis of the broadcast content or midnight (0:00) is employed as the basis, and the time from this basis time is specified in media_time. The time specified in media_ time is in units of a second or millisecond for example.

In event_id, an ID adapted to identify an event specified by the TPT and the AMT is specified. In event_time, information indicating a time when this event is executed is specified.

In spread, information adapted to stochastically disperse a timing at which the trigger information is applied is specified.

In version, version information indicating a version of the TPT is specified. For example, in the case of updating the TPT and the AMT retained in the receiving device 20, version information of the TPT whose version is upgraded is specified in version.

(Description Examples of Trigger Information)

FIG. 5 is a diagram showing description examples of the trigger information.

In FIG. 5, plural description examples of the trigger information are shown. The trigger information is formed of a character string obtained by linking values adapted to specify domain_name, segment_id, media_time, event_id, event_time, spread, and version and predetermined characters such as "/," "?m=," and "&."

For example, if domain_name is "xbc.com," segment_id is "SegA," and media_time is "1000," the character string indicating the trigger information is "xbc.com/SegA?m=1000."

That is, if "http://" is added to the beginning of this character string, "http://xbc.com/SegA?m=1000" as a URL (uniform resource locator) for access to a predetermined server is obtained. Because a query character string of m=<media_time> is added at the end of this URL, the accessed server can acquire the parameter by utilizing a GET method of an HTTP (hypertext transfer protocol).

Character strings of m=<media_time>, e=<event_id>, t=<event_time>, s=<spread>, and v=<version> are linked to the character string indicating the trigger information. This allows the receiving device 20 to acquire values of media_time, event_id, event_time, spread, and version. Based on these acquired values, the receiving device 20 controls the operation of the conjunction application and updates the TPT and the AMT for example.

A description method of the trigger information is arbitrary and is not limited to the description examples shown in FIG. 5.

The trigger information is configured in the above-described manner.

[Detailed Configuration of TPT]

Next, a detailed configuration of the TPT will be described.

FIG. 6 is a diagram showing one example of a detailed specification of the TPT. The TPT is described by a markup language such as the XML (extensible markup language) for example.

As shown in FIG. 6, a TPT element is described as a root element of the TPT. In the TPT element, information of an event adapted to control the operation of a conjunction application and so forth is described.

The TPT element includes protocolVersion attribute, id attribute, tptVersion attribute, updatingTime attribute, expireDate attribute, serviceId attribute, baseURL attribute, Capabilities element, LiveTrigger element, and Application element.

In the protocolVersion attribute, information indicating a version of a specification defined in this TPT is specified. This version includes a major version and a minor version.

In the id attribute, an ID adapted to identify this TPT is specified. For example, in the id attribute, a character string obtained by linking domain_name and program_id by "/" is specified. program_id corresponds to segment_id and is an ID by which broadcast content can be identified.

In the tptVersion attribute, information indicating the version of this TPT is specified.

In the updatingTime attribute, information indicating an update period of this TPT is specified.

In the expireDate attribute, information indicating an expiration date of this TPT is specified.

In the serviceId attribute, an ID indicating which service is used to transmit the conjunction application among services that are so transmitted as to be included in a broadcast signal is specified. For example, if the conjunction application is transmitted by an NRT (non-realtime) service, service_id of the NRT service is specified in the serviceId attribute.

The NRT service is a service in which reproduction is performed after NRT content transmitted by utilizing a FLUTE (file delivery over unidirectional transport) session is temporarily accumulated in a storage of a receiver. In the case of utilizing the NRT service, a conjunction application is transmitted instead of NRT content.

In the baseURL attribute, a URL serving as a base of the URL specified by this TPT is specified. For example, "http://xbc.com" is specified in the baseURL attribute. Therefore, a relative path when the base URL is employed as the basis may be specified in another URL specified by this TPT.

In the Capabilities element, information indicating a function required for the receiving device 20 in control of the operation of the conjunction application by use of this TPT is specified. That is, when having the function specified by the Capabilities element, the receiving device 20 determines that this TPT can be utilized. When the receiving device 20 does not have the specified function, this TPT is ignored.

The LiveTrigger element is a child element of the TPT element, and information relating to trigger information adapted to allow a broadcaster or so forth to execute an event at desired timing in the case of a live broadcast of broadcast content (hereinafter, referred to as the live trigger information) is described. The LiveTrigger element includes URL attribute, deliveryType attribute, and pollPeriod attribute.

In the URL attribute, a URL for access to a server that provides live trigger information (trigger server 80 in FIG. 16 to be described later) is described.

In the deliveryType attribute, a regulation in reception of live trigger information is specified. In the deliveryType attribute, "Streaming," "long polling," or "short polling" is specified.

In the pollPeriod attribute, a time indicating an interval of querying to the trigger server 80 (FIG. 16) about live trigger information is specified. This time is specified in units of a second for example.

The Application element is a child element of the TPT element and information relating to the conjunction application is described. The Application element includes appID attribute, appType attribute, appName attribute, globalId attribute, appVersion attribute, testApp attribute, cookieSpace attribute, frequencyOfUse attribute, frequencyOfUpdate attribute, expireDate attribute, availInternet attribute, availBroadcast attribute, URL element, Capabilities element, ContentItem element, and Event element.

In the appID attribute, an ID adapted to identify the relevant conjunction application is specified.

In the appType attribute, information relating to file attribute of the relevant conjunction application and so forth is specified.

In the appName attribute, information indicating a name of the relevant conjunction application is specified. For example, when plural conjunction applications can be activated, names of them are presented to a user to allow selection, thereby making a desired conjunction application be activated.

In the globalId attribute, a URI (uniform resource identifier) by which the relevant conjunction application can be globally identified is specified.

In the appVersion attribute, information indicating the version of the relevant conjunction application is specified.

The testApp attribute is specified when the relevant conjunction application is used for the purpose of a test of product development for example. Therefore, this testApp attribute is ignored in normal operation.

In the cookieSpace attribute, information indicating a storage capacity necessary when the relevant conjunction application is run is specified.

In the frequencyOfUse attribute, information indicating at what frequency the relevant conjunction application is used is specified. For example, this use frequency is specified in units of an hour or in units of a day and a conjunction application whose use frequency is high can be preferentially cached.

In the frequencyOfUpdate attribute, information indicating at what frequency the relevant conjunction application is updated is specified. For example, this update frequency is specified in units of an hour or in units of a day and a conjunction application whose update frequency is high can be preferentially cached.

In the expireDate attribute, information indicating an expiration date of the relevant conjunction application is specified.

In the availInternet attribute, information indicating whether or not the relevant conjunction application is delivered by the Internet is specified.

In the availBroadcast attribute, information indicating whether or not the relevant conjunction application is delivered by a broadcast is specified.

In the URL element, a URL indicating an acquisition source of the relevant conjunction application is specified. For example, the URL of the application server 40 is specified in the URL element. If e.g. "http://xbc.com" is specified as the above-described base URL, the character string that follows it and is after "/" is specified in this URL element.

In the Capabilities element, information indicating the function required for the receiving device 20 in running of the relevant conjunction application is specified. That is, when having the function specified by the Capabilities element, the receiving device 20 determines that the relevant conjunction application can be run.

The ContentItem element is a child element of the Application element and information relating to cache of files (e.g. HTML (hypertext markup language) file, JPEG (joint photographic experts group) file, etc.) configuring the relevant conjunction application is described. The ContentItem element includes URL element, updatesAvail element, and Size element.

In the URL element, a URL of a file to be cached is specified.

In the updatesAvail element, information relating to update of the file to be cached is specified.

In the Size element, information indicating the size of the file to be cached is specified.

The Event element is a child element of the Application element and control information adapted to control the operation of the conjunction application is described. The Event element includes eventId attribute, destination attribute, action attribute, diffusion attribute, and data element.

In the eventId attribute, an ID adapted to identify an event is specified.

In the destination attribute, apparatus as a control target of the conjunction application by the relevant event is specified. Here, besides the receiving device 20, for example, if an external device (not shown) is connected to the receiving device 20, this external device is specified as a target apparatus of the event.

For example, in the destination attribute, "HDTV (high definition television)" is specified if the target apparatus of the event is a television receiver compatible with high image quality, and "SDTV (standard definition television)" is specified if the target apparatus is a television receiver compatible with standard image quality. "external_1," "external_2," or so forth is specified if the target apparatus of the event is an external device.

In the action attribute, "register," "execute," "suspend," "terminate," "stream-event," etc. is specified as an action specified by the relevant event.

The register is an action adapted to order acquisition or registration of a conjunction application. Here, the registration of the conjunction application means that the priority and expiration date of the acquired conjunction application are stored in association with the acquired conjunction application.

The execute is an action adapted to order acquisition or activation of a conjunction application. If the specified conjunction application is in a pause, the execute resumes running of this conjunction application.

The suspend is an action adapted to suspend the running conjunction application to make it pause.

The terminate is an action adapted to stop the running conjunction application.

The stream-event is an action adapted to fire an event in the running conjunction application.

As the action specified in the action attribute, not only the above-described actions but also another action such as "suspend-execute" or "terminate-execute" can be specified for example.

The suspend-execute is a composite-type action arising from integration of the execute for the specified conjunction application and the suspend for another conjunction application. That is, "suspend-execute" is specified in the action attribute in the case of ordering acquisition or activation of the specified conjunction application and a pause of another conjunction application other than it.

The terminate-execute arises from integration of the execute for the specified conjunction application and the terminate for another conjunction application. That is, "terminate-execute" is specified in the action attribute in the case of ordering acquisition or activation of the specified conjunction application and stop of another conjunction application other than it.

In the diffusion attribute, information adapted to stochastically disperse the timing at which the event is applied in the receiving device 20 is specified. Due to the setting of this information, when the plural receiving devices 20 acquire a conjunction application from the application server 40, the access thereof can be dispersed without concentrating on one time.

In the data element, data referenced in firing of the relevant event when the action is the stream-event is specified.

The TPT is configured in the above-described manner.

The specification of the TPT explained with reference to FIG. 6 is one example and another specification can also be employed.

[Detailed Configuration of AMT]

Next, a detailed configuration of the AMT will be described.

FIG. 7 is a diagram showing one example of a detailed specification of the AMT. The AMT is described by a markup language such as the XML for example.

As shown in FIG. 7, an AMT element is described as the root element of the AMT. In the AMT element, information of the valid period of an event adapted to control the operation of a conjunction application and so forth is described.

The AMT element includes protocolVersion attribute, segmentId attribute, beginMT attribute, and Activation element.

In the protocolVersion attribute, information indicating s version of s specification defined in this AMT is specified. This version includes a major version and a minor version.

In the segmentId attribute, an ID corresponding to the id attribute of the TPT is specified. By this ID, the TPT corresponding to this AMT is identified. For example, a character string obtained by linking domain_name and program_id by "/" is specified in the segmentId attribute.

In the beginMT attribute, information indicating a start time of a time range of a subject segment (specific interval) is specified.

The Activation element is a child element of the AMT element and information adapted to identify the event for the conjunction application is described. The Activation element includes targetId attribute, startTime attribute, and endTime attribute.

In the targetId attribute, an ID that is described in the TPT and is adapted to identify the event for the conjunction application is specified. For example, in this ID, an object obtained by combining the ID specified in the appID attribute of the Application element of the TPT and the ID specified in the eventId attribute of the Event element is specified.

In the startTime attribute, information indicating a start time of the valid period of the event identified by the targetId attribute is specified.

In the endTime attribute, information indicating an end time of the valid period of the event identified by the targetId attribute is specified.

That is, the valid period of the event is defined by the startTime attribute and the endTime attribute, which indicate two points on the progression time axis of the corresponding broadcast content. For example, in the receiving device 20, when the time indicated by the media clock passes the valid start time indicated by the startTime attribute, the event corresponding to this valid start time is deemed to be valid. However, in this case, only the startTime attribute may be specified without specifying the endTime attribute.

When the time indicated by the media clock is in the valid period, the event corresponding to this valid period may be deemed to be valid. When the time indicated by the media clock does not reach the valid period or has passed it, the event corresponding to this valid period may be deemed to be invalid.

In other words, in the receiving device 20, when the time indicated by the media clock satisfies a predetermined valid condition based on the valid time, the valid period, and so forth, the event corresponding to this valid condition is deemed to be valid and the action specified by this event is identified.

The AMT is configured in the above-described manner.

The specification of the AMT explained with reference to FIG. 7 is one example and another specification can also be employed.

[Update Control of TPT and AMT]

Next, update control of the TPT and the AMT will be described with reference to FIG. 8 and FIG. 9.

(Update Control Using updatingTime)

Figure 8:
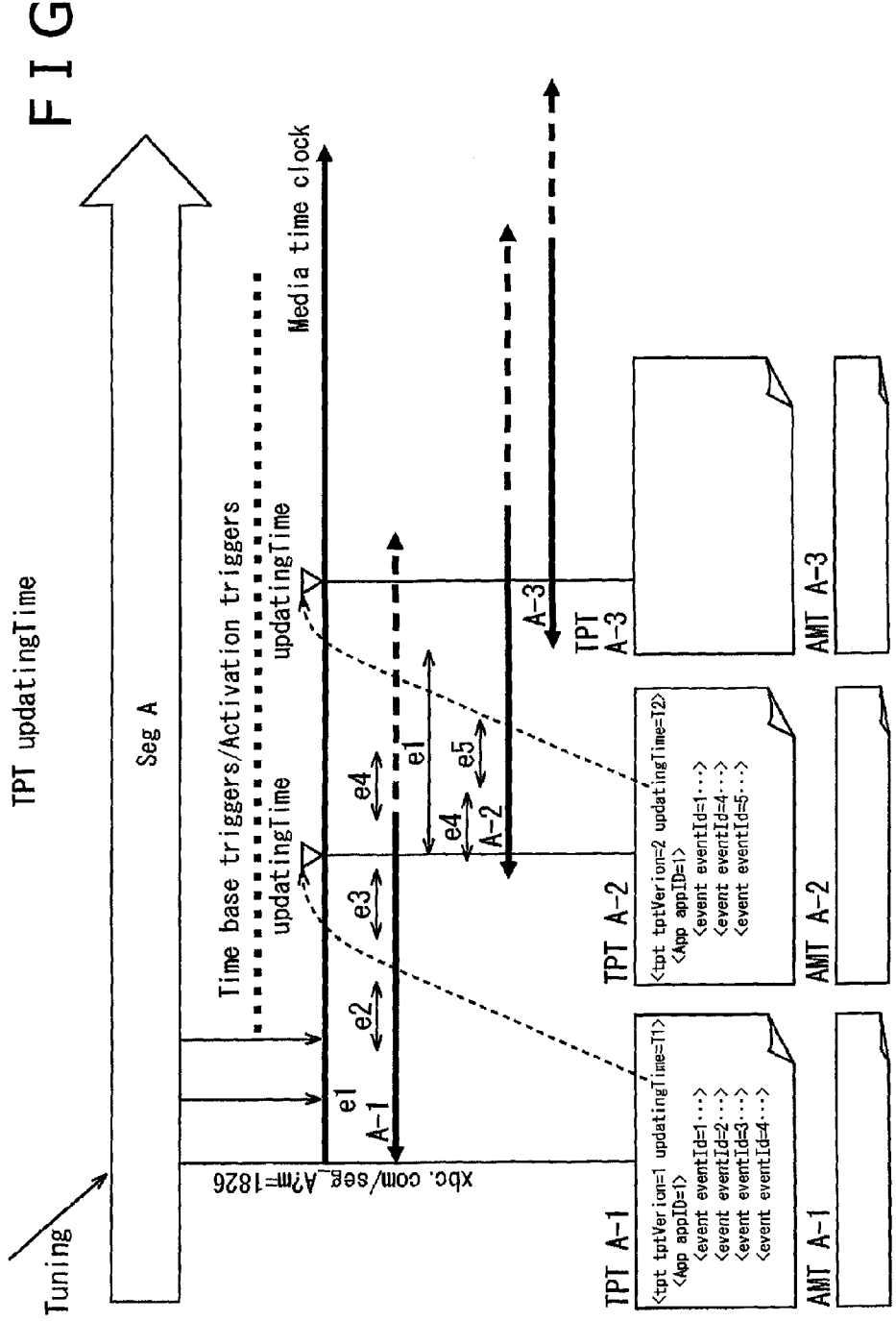
FIG. 8 is a diagram showing an example of update of the TPT and the AMT in accordance with updatingTime.

FIG. 8 is a diagram showing an example of update of the TPT and the AMT in accordance with updatingTime. In FIG. 8, "A-1," "A-2," "A-3," . . . described together with the TPT and the AMT indicate the version information of the TPT and the AMT.

When the TPT and the AMT are updated in accordance with updatingTime of the TPT, the receiving device 20 acquires the TPT and the AMT from the TPT/AMT server 30 depending on the update period specified by updatingTime.

As shown in FIG. 8, when trigger information (xbc.com/seg_A?m=1826) is extracted, the receiving device 20 accesses the TPT/AMT server 30 in accordance with a URL obtained from the trigger information to acquire a TPT A-1 and an AMT A-1. The receiving device 20 sets media_time (m=1826) included in this trigger information for the media clock ("Media time clock" in the diagram).

In the TPT A-1, actions corresponding to eventId="1" (e1), "2" (e2), "3" (e3), "4" (e4), . . . are specified. Therefore, in the receiving device 20, an action corresponding to a relevant eventId is sequentially identified when the time indicated by the media clock passes the time specified in the AMT A-1. The receiving device 20 controls the operation of a conjunction application in response to the identified action.

In the example of FIG. 8, the conjunction application operates in response to the actions corresponding to e1, e2, and e3. However, before the action of e4 is identified, the time passes an update period T1 indicated by updatingTime of the TPT A-1 and thus a TPT A-2 and an AMT A-2 are acquired from the TPT/AMT server 30 in the receiving device 20.

In the TPT A-2, actions corresponding to eventId="1" (e1), "4" (e4), "5" (e5), . . . are specified. That is, e4 is reset and e5 is newly added by the TPT A-2. In the receiving device 20, when the time indicated by the media clock passes the time specified in the AMT A-2, actions corresponding to e1, e4, and e5 are sequentially identified and the operation of the conjunction application is controlled in response to this.

When the time passes an update time T2 indicated by updatingTime of the TPT A-2, the receiving device 20 acquires a TPT A-3 and an AMT A-3 from the TPT/AMT server 30. The receiving device 20 refers to the TPT A-3 and the AMT A-3 to identify an action for the specified conjunction application.

In the above-described manner, in the update control using updatingTime, the TPT and the AMT are acquired from the TPT/AMT server 30 to be updated every time the update period specified by updatingTime described in each TPT elapses.

(Update Control Using Version Included in Trigger Information)

Figure 9:
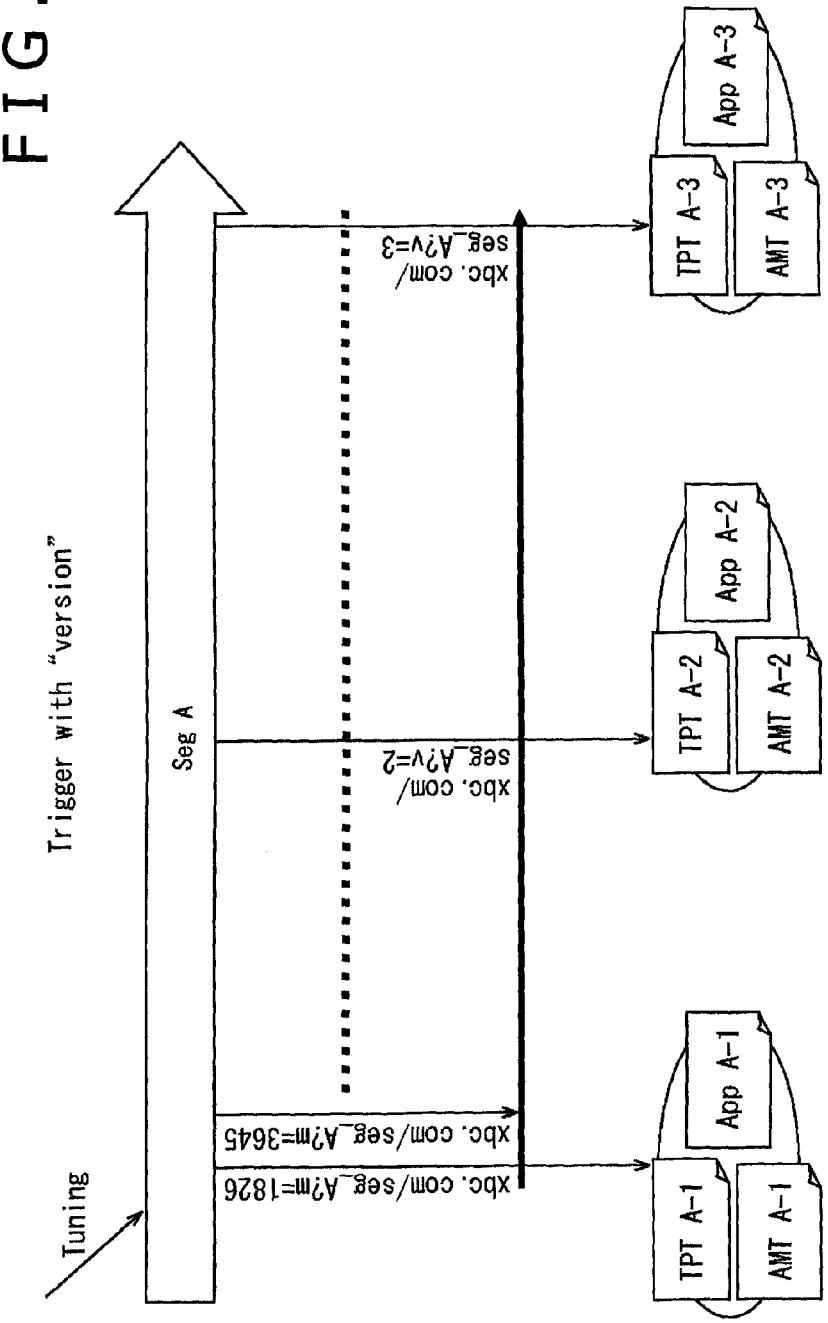
FIG. 9 is a diagram showing an example of update of the TPT and the AMT in accordance with version included in the trigger information.

FIG. 9 is a diagram showing an example of update of the TPT and the AMT in accordance with version included in trigger information. In FIG. 9, "A-1," "A-2," "A-3," . . . described together with TPT, AMT, and App indicate the version information of TPT, AMT, and App.

When the TPT and the AMT are updated in accordance with version included in trigger information, the receiving device 20 acquires the TPT and the AMT from the TPT/AMT server 30 if the version information indicated by version included in the trigger information is different from the version information indicated by tptVersion of the TPT.

As shown in FIG. 9, when trigger information (xbc.com/seg_A?m=1826) is extracted, the receiving device 20 accesses the TPT/AMT server 30 in accordance with a URL obtained from the trigger information to acquire the TPT A-1 and the AMT A-1. The receiving device 20 sets media_time (m=1826) included in this trigger information for the media clock. The receiving device 20 refers to the TPT A-1 and the AMT A-1 to identify an action for a conjunction application App A-1 and control the operation of the conjunction application App A-1.

In the receiving device 20, when trigger information (xbc.com/seg_A?m=3645) is extracted, update of the TPT and the AMT is not performed because domain_name and segment_id do not change. However, media_time (m=3645) included in this trigger information is reset for the media clock.

Also after that, in the receiving device 20, continuously the trigger information in which media_time and so forth other than version is included is extracted, and resetting of the media clock and so forth is performed.

Then, in the receiving device 20, when trigger information (xbc.com/seg_A?v=2) in which version is included is extracted, the version information specified in version included in this trigger information is compared with the version information specified by tptVersion described in the TPT A-1.

Here, for example if tptVersion of the TPT A-1 is "1," the version information differs from v="2" specified in version included in the trigger information and therefore the receiving device 20 acquires the TPT A-2 and the AMT A-2 from the TPT/AMT server 30. Then, the receiving device 20 refers to the TPT A-2 and the AMT A-2 to identify an action for a conjunction application App A-2 and control the operation of the conjunction application App A-2. Here, the conjunction application App A-2 may be newly acquired from the application server 40 or the running conjunction application App A-1 may be continuously run without change.

Thereafter, in the receiving device 20, continuously the trigger information in which media_time and so forth other than version is included is extracted, and resetting of the media clock and so forth is performed.

Then, in the receiving device 20, when trigger information (xbc.com/seg_A?v=3) in which version is included is extracted again, the version information specified in version included in this trigger information is compared with the version information specified by tptVersion described in the TPT A-2.

Here, for example if tptVersion of the TPT A-2 is "2," the version information differs from v. "3" specified in version included in the trigger information and therefore the receiving device 20 acquires the TPT A-3 and the AMT A-3 from the TPT/AMT server 30. Then, the receiving device 20 refers to the TPT A-3 and the AMT A-3 to identify an action for a conjunction application App A-3 and control the operation of the conjunction application App A-3. Here, too, the conjunction application App A-3 may be newly acquired or the running conjunction application may be run without change.

From then on, similarly to the above-described case, the trigger information in which version is included is extracted in the receiving device 20. If the version information thereof is different from tptVersion of the TPT, the TPT and the AMT are updated.

In the above-described manner, in the update control using version included in the trigger information, the TPT and the AMT are updated if the version information specified by this version is different from the version information specified by tptVersion of the TPT that has been acquired.

That is, by making version be included in the trigger information at arbitrary timing, a provider can update the TPT and the AMT at arbitrary timing such as when the contents of the TPT and the AMT are desired to be changed for example. As a result, in the receiving device 20, the TPT and the AMT intended by the provider are properly retained and the conjunction application operates in proper conjunction with broadcast content.

[Contents of Specific Processing Executed in Respective Devices]

Next, with reference to flowcharts of FIG. 10 to FIG. 15, contents of specific processing executed in the respective devices configuring the broadcast-communication cooperative system 1 will be described.

(Transmission Processing)

Figure 10:
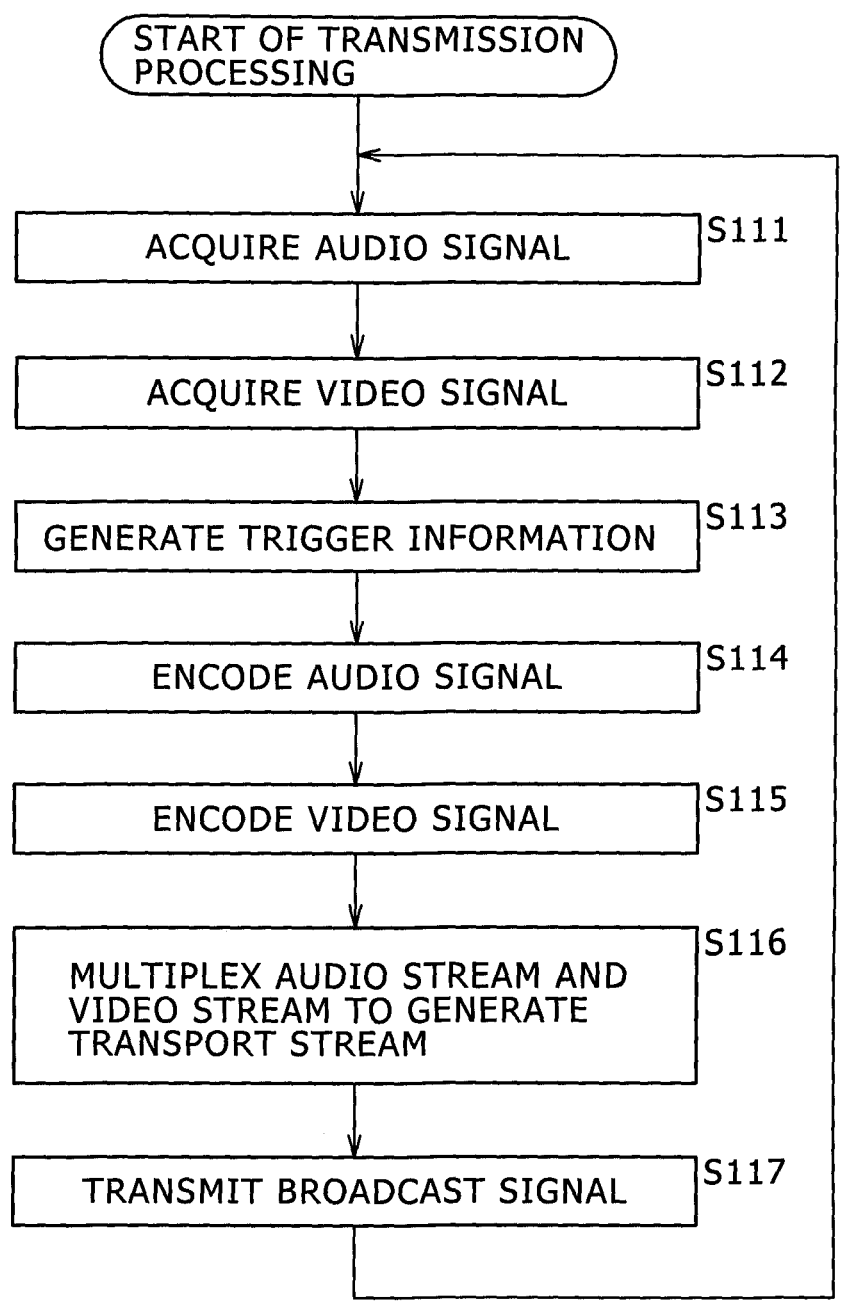
FIG. 10 is a flowchart explaining transmission processing.

First, with reference to the flowchart of FIG. 10, transmission processing executed by the transmitting device 10 will be described.

In a step S111, the audio acquirer 111 acquires an audio signal corresponding to the audio of broadcast content from an external server or so forth. In a step S112, the video acquirer 113 acquires a video signal corresponding to the video of the broadcast content from the external server or so forth.

In a step S113, the trigger information generator 114 generates trigger information in association with the progression of the video of the broadcast content corresponding to the video signal acquired by the video acquirer 113.

In a step S114, the audio encoder 112 encodes the audio signal acquired by the audio acquirer 111.

In a step S115, the video encoder 115 encodes the video signal acquired by the video acquirer 113. The video encoder 115 disposes the trigger information in subtitle data in the user data area of a video stream obtained by the encoding.

In a step S116, the multiplexer 116 multiplexes an audio stream encoded by the audio encoder 112 and the video stream encoded by the video encoder 115 to generate a transport stream.

In a step S117, the transmitter 117 transmits the transport stream generated by the multiplexer 116 as a broadcast signal via the antenna 118. Thereafter, the processing is returned to the step S111 and this and subsequent processing is repeated.

This is the end of the explanation of the transmission processing.

(Reception Processing)

Figure 11:
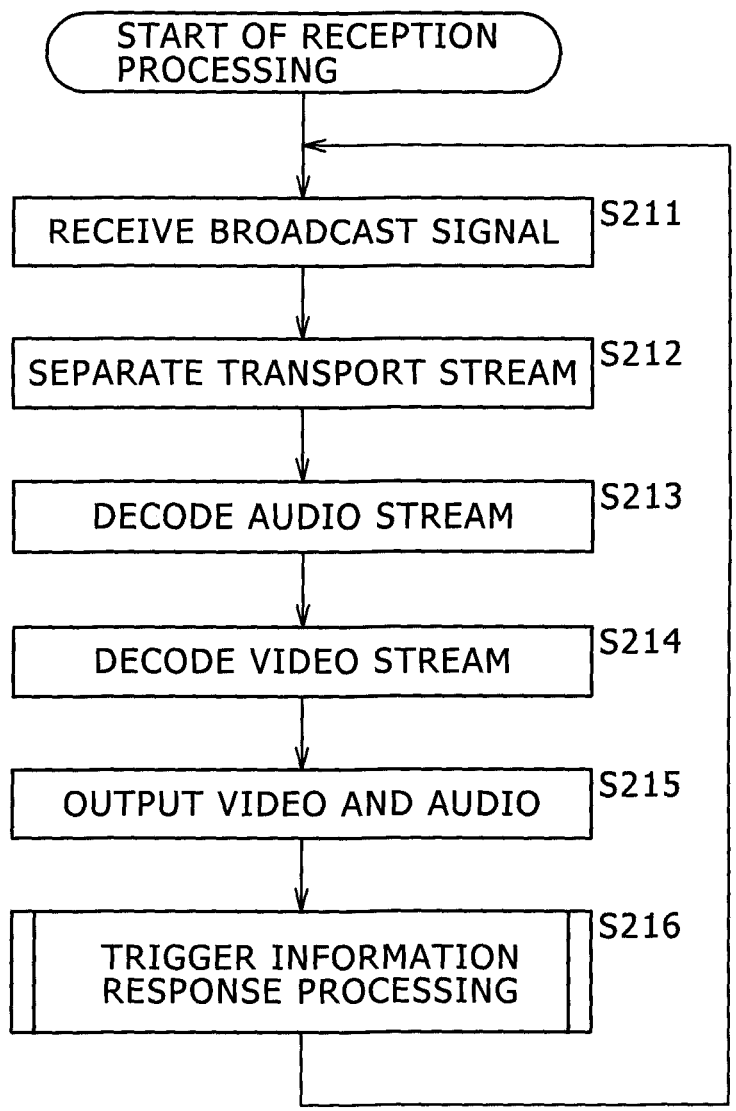
FIG. 11 is a flowchart explaining reception processing.

Next, with reference to the flowchart of FIG. 11, reception processing executed by the receiving device 20 will be described.

In a step S211, the tuner 212 receives a broadcast signal via the antenna 211 and demodulates it.

In a step S212, the demultiplexer 213 separates a transport stream demodulated by the tuner 212 into an audio stream and a video stream.

In a step S213, the audio decoder 214 decodes the audio stream separated by the demultiplexer 213 to generate an audio signal.

In a step S214, the video decoder 217 decodes the video stream separated by the demultiplexer 213 to generate a video signal.

In a step S215, the speaker 216 outputs audio corresponding to the audio signal. The display 219 displays video corresponding to the video signal. Thus, video of broadcast content such as a television show is displayed on the display 219 and audio corresponding to this video is output from the speaker 216.

In a step S216, trigger information response processing is executed by the components from the trigger information extractor 220 to the application memory 228. Details of the trigger information response processing will be described later with reference to the flowchart of FIG. 12.

Upon the end of the trigger information response processing of the step S216, the processing returns to the step S211 and this and subsequent processing is repeated.

This is the end of the explanation of the reception processing.

(Trigger Information Response Processing)

Figure 12:
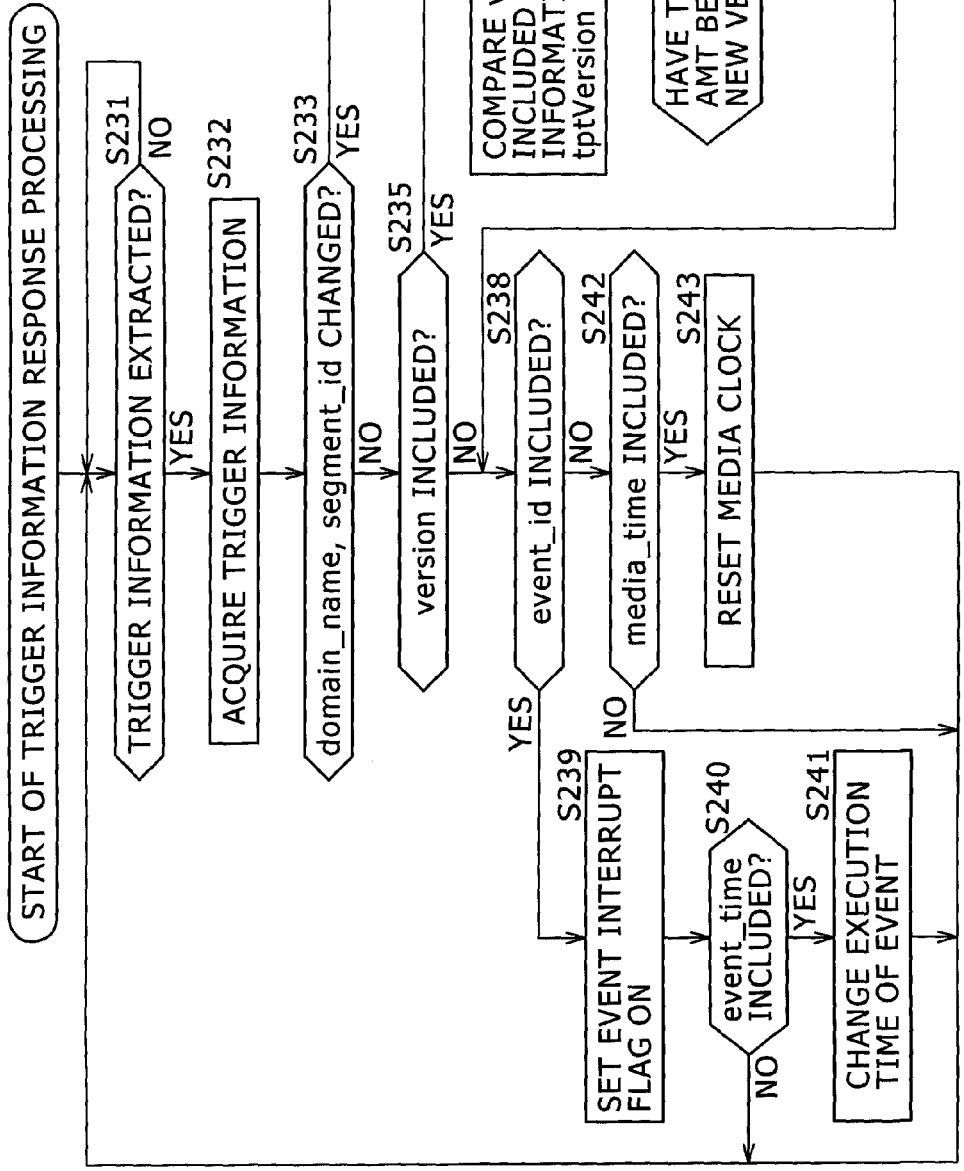
FIG. 12 is a flowchart explaining trigger information response processing.

Next, with reference to the flowchart of FIG. 12, details of the trigger information response processing corresponding to the step S216 in FIG. 11 will be described.

In a step S231, the trigger information extractor 220 waits until the trigger information is extracted from the video stream separated by the demultiplexer 213.

Then, if the trigger information included in the broadcast signal is received and the trigger information is extracted from the video stream in the receiving device 20, the processing is forwarded to a step S232. the step S232, the trigger information extractor 220 acquires the trigger information extracted from the video stream.

In a step S233, the control section 221 analyzes the trigger information from the trigger information extractor 220 and determines whether or not domain_name or segment_id included in this trigger information has changed. If it is determined in the step S233 that domain_name or segment_id has changed, the processing is forwarded to a step S234.

If it is determined in the step S233 that domain_name or segment_id has not changed, the processing is forwarded to a step S235. In the step S235, in accordance with the analysis result of the trigger information, the control section 221 determines whether or not version is included in this trigger information.

If it is determined in the step S235 that version is included, the processing is forwarded to a step S236. In the step S236, the control section 221 compares the version information indicated by version included in this trigger information with the version information indicated by tptVersion of the TPT retained in the TPT/AMT analyzer 225.

In a step S237, the control section 221 determines whether or not the TPT and the AMT have become a new version in accordance with the comparison result of the step S236. If it is determined in the step S237 that the version information differs between version of the trigger information and tpt-Version of the TPT and the TPT and the AMT have become a new version, the processing is forwarded to the step S234.

In the step S234, TPT/AMT/App acquisition processing is executed. In the TPT/AMT/App acquisition processing, besides TPT/AMT acquisition processing to acquire TPT and AMT from the TPT/AMT server 30, App acquisition processing to acquire a conjunction application from the application server 40 is executed as appropriate. If the TPT and the AMT of the new version are acquired by this TPT/AMT acquisition processing, the TPT/AMT analyzer 225 retains them instead of the TPT and the AMT of the old version.

Figure 13:
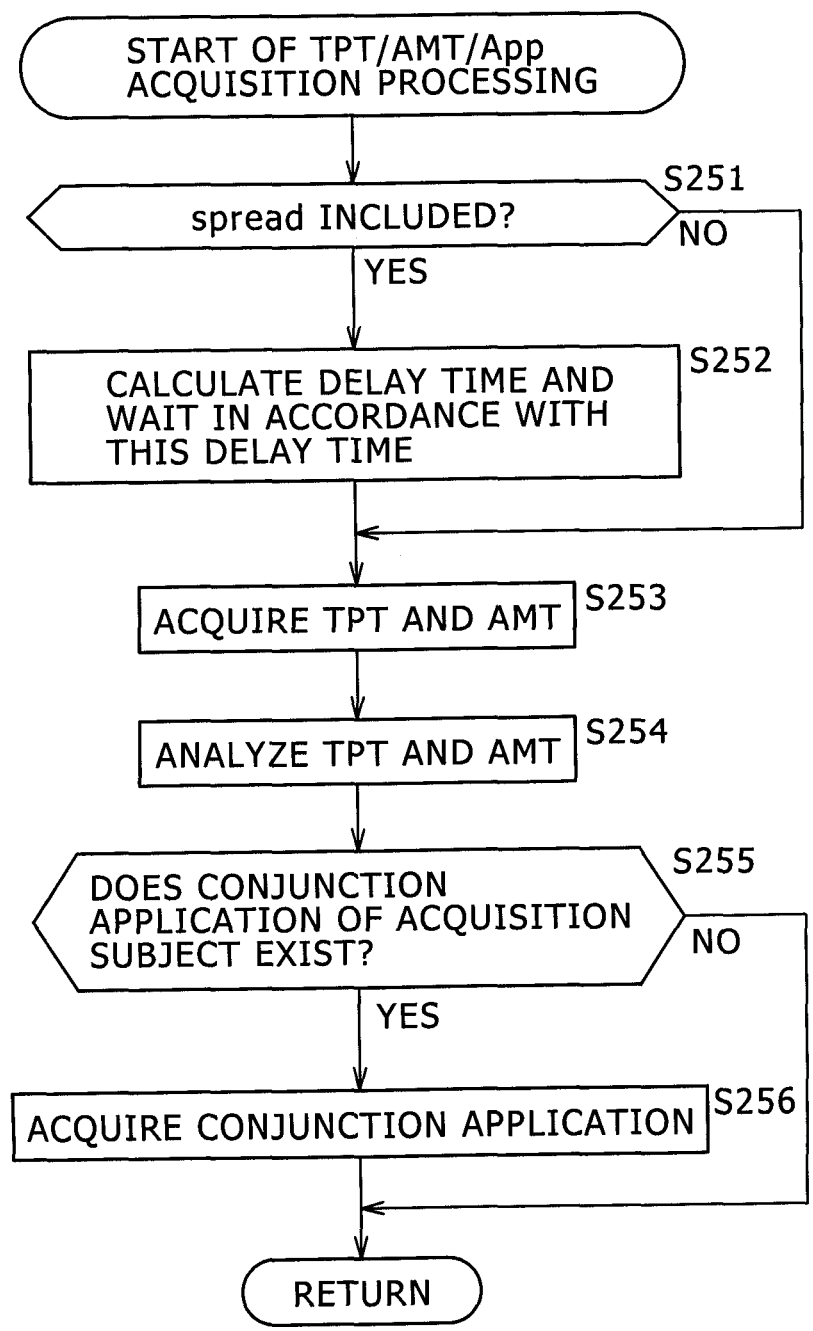
FIG. 13 is a flowchart explaining TPT/AMT/App acquisition processing.

Details of the TPT/AMT/App acquisition processing will be described later with reference to the flowchart of FIG. 13.

The processing is forwarded to a step S238 if the processing of the step S234 ends, if it is determined in the step S235 that version is not included in the trigger information ("NO" of S235), or if it is determined in the step S237 that the version information is the same between version of the trigger information and tptVersion of the TPT and the version of the TPT and the AMT has not changed ("NO" of S237).

In the step S238, in accordance with the analysis result of the trigger information, the control section 221 determines whether or not event_id is included in this trigger information. If it is determined in the step S238 that event_id is included, the processing is forwarded to a step S239.

In the step S239, the control section 221 sets an event interrupt flag on.

Here, the event interrupt flag is a flag set in a case in which a valid event is not specified based on the media clock and an event according to event_id, which is so transmitted as to be included in trigger information at arbitrary timing, is specified. Therefore, the event interrupt flag is set on in an interrupt period from specifying of the event according to event_id until execution of an action according to this event, whereas it is set off in other periods.

Although details will be described later, in conjunction application control processing (FIG. 14), an action for the specified conjunction application is executed when the event interrupt flag becomes on.

Upon the end of the processing of the step S239, the processing is forwarded to a step S240. In the step S240, in accordance with the analysis result of the trigger information, the control section 221 determines whether or not event_time is included in this trigger information. If it is determined in the step S240 that event_time is included, the processing is forwarded to a step S241.

In the step S241, the control section 221 changes the execution time of the event specified by event_id to the time specified in event_time.

If it is determined in the step S240 that event_time is not included ("NO" of S240), the processing of the step S241 is skipped.

If it is determined in the step S238 that event_id is not included in the trigger information, the processing is forwarded to a step S242. In the step S242, in accordance with the analysis result of the trigger information, the control section 221 determines whether or not media_time is included in this trigger information. If it is determined in the step S242 that media_time is included, the processing is forwarded to a step S243.

In the step S243, the control section 221 resets the time specified in media_time for the media clock that has been set in the conjunction application control processing (step S273 in FIG. 14) to be described later. Thus, the media clock is calibrated and it becomes possible to execute the action corresponding to the specified event at more accurate time.

If it is determined in the step S242 that media_time is not included, the processing of the step S243 is skipped.

When the processing of the step S241 ends or is skipped or when the processing of the step S243 ends or is skipped, the processing is returned to the step S231 and this and subsequent processing is repeated.

This is the end of the explanation of the trigger information response processing.

(TPT/AMT/App Acquisition Processing)

Next, with reference to the flowchart of FIG. 13, details of the TPT/AMT/App acquisition processing corresponding to the step S234 in FIG. 12 will be described.

In a step S251, in accordance with the analysis result of the trigger information, the control section 221 determines whether or not spread is included in this trigger information. If it is determined in the step S251 that spread is included, the processing is forwarded to a step S252.

In the step S252, the control section 221 calculates delay time in access to the TPT/AMT server 30 or the application server 40 based on the information that is specified by spread and is adapted to stochastically disperse the timing at which the trigger information is applied, and waits until this delay time elapses.

Specifically, when a large number of receiving devices 20 are receiving broadcast content from the transmitting device 10, if these receiving devices 20 simultaneously access a server in response to trigger information, a burden on the server increases and a communication volume on the Internet 90 at the time of a peak increases. So, the respective receiving devices 20 shift the timing of the access to the server in accordance with spread included in the trigger information, which can alleviate the burden on the server and the communication volume at the time of the peak.

When the delay time calculated in the step S252 elapses, the processing is forwarded to a step S253. In the step S253, the TPT/AMT analyzer 225 acquires the TPT and the AMT provided from the TPT/AMT server 30.

Specifically, the control section 221 controls the communication I/F 224 to access the TPT/AMT server 30 identified by the URL (e.g. http://xbc.com/seg_A) obtained by adding "http://" to the beginning of the trigger information and request TPT and AMT. The TPT/AMT server 30 manages the TPT and the AMT of each piece of broadcast content and specifies the TPT and the AMT for broadcast content identified by segment_id and so forth included in the request for the TPT and the AMT from the receiving device 20 to provide them to the receiving device 20.

The communication I/F 224 receives the TPT and the AMT provided from the TPT/AMT server 30 in accordance with control from the control section 221. This allows the TPT/AMT analyzer 225 to acquire the TPT and the AMT received by the communication I/F 224.

In a step S254, the TPT/AMT analyzer 225 analyzes the TPT and the AMT. The analysis result of the TPT and the AMT is accordingly supplied to the control section 221.

If it is determined in the step S251 that spread is not included, the processing of the step S252 is skipped and the processing is forwarded to the step S253. In this case, the receiving device 20 immediately accesses the TPT/AMT server 30 without waiting for the delay time to acquire and analyze the TPT and the AMT.

Upon the end of the processing of the step S254, the processing is forwarded to a step S255. In the step S255, in accordance with the analysis result of the trigger information, the control section 221 determines whether or not the conjunction application of an acquisition subject exists. For example, if segment_id has changed and the segment of the broadcast content has changed, it is determined that the conjunction application that should be acquired exists and the processing is forwarded to a step S256.

In the step S256, the communication I/F 224 acquires the conjunction application provided from the application server 40 and retains it in the cache memory 227 in accordance with control from the control section 221.

Specifically, when the delay time calculated in the step S252 elapses, the control section 221 controls the communication I/F 224 to access the application server 40 identified by the URL specified by the TPT and the AMT and request the conjunction application. The communication I/F 224 receives the conjunction application provided from the application server 40 in accordance with control from the control section 221. Thus, the conjunction application acquired by the communication I/F 224 is retained in the cache memory 227.

If it is determined in the step S255 that the conjunction application of the acquisition subject does not exist, the processing of the step S256 is skipped. When the processing of the step S256 ends or is skipped, the TPT/AMT/App acquisition processing is ended and the processing is returned to the processing of the step S234 in FIG. 12, so that the subsequent processing is executed.

This is the end of the explanation of the TPT/AMT/App acquisition processing.

(Conjunction Application Control Processing)

In the receiving device 20, in parallel to the above-described trigger information response processing executed at the timing when trigger information is extracted, the conjunction application control processing is executed in the time series of the media clock. Next, the conjunction application control processing will be described with reference to the flowchart of FIG. 14.

In a step S271, the control section 221 waits until the TPT and the AMT from the TPT/AMT server 30 are acquired by the TPT/AMT analyzer 225. This TPT/AMT acquisition processing corresponds to the steps S251 to S254 in the above-described FIG. 13. Then, if the TPT/AMT acquisition processing in FIG. 13 is executed and the TPT and the AMT from the TPT/AMT server 30 are acquired, the processing is forwarded to a step S272.

In the step S272, the control section 221 waits until trigger information including media_time is extracted first. Then, if trigger information is extracted in the step S231 in the above-described FIG. 12 and media_time is included in this trigger information, the processing is forwarded to a step S273.

In the step S273, the control section 221 sets the time specified in media_time included in the trigger information for the media clock, thereby starting timing of the media clock.

In the receiving device 20, because the TPT and the AMT are acquired and moreover timing of the media clock is started, control of the conjunction application in the time series of the media clock is carried out.

In a step S274, the control section 221 determines whether or not the time indicated by the media clock is in the valid period of the event specified by the TPT and the AMT. If it is determined in the step S274 that the time is in the valid period of the event, the processing is forwarded to a step S275.

If it is determined in the step S274 that the time is not in the valid period of the event, the processing is forwarded to a step S276. In the step S276, the control section 221 determines whether or not the event interrupt flag is set on. This event interrupt flag is set on in the step S239 in the above-described FIG. 12 if event_id is included in the trigger information.

If it is determined in the step S276 that the event interrupt flag is set on, the processing is forwarded to the step S275.

In the step S275, action execution processing is executed. In the action execution processing, an action specified by a valid event is identified and the operation of a conjunction application is controlled in response to this action. Here, for example, acquisition or registration, acquisition or activation, event firing, suspension or resumption, stop, etc. of the conjunction application is controlled.

Figure 15:
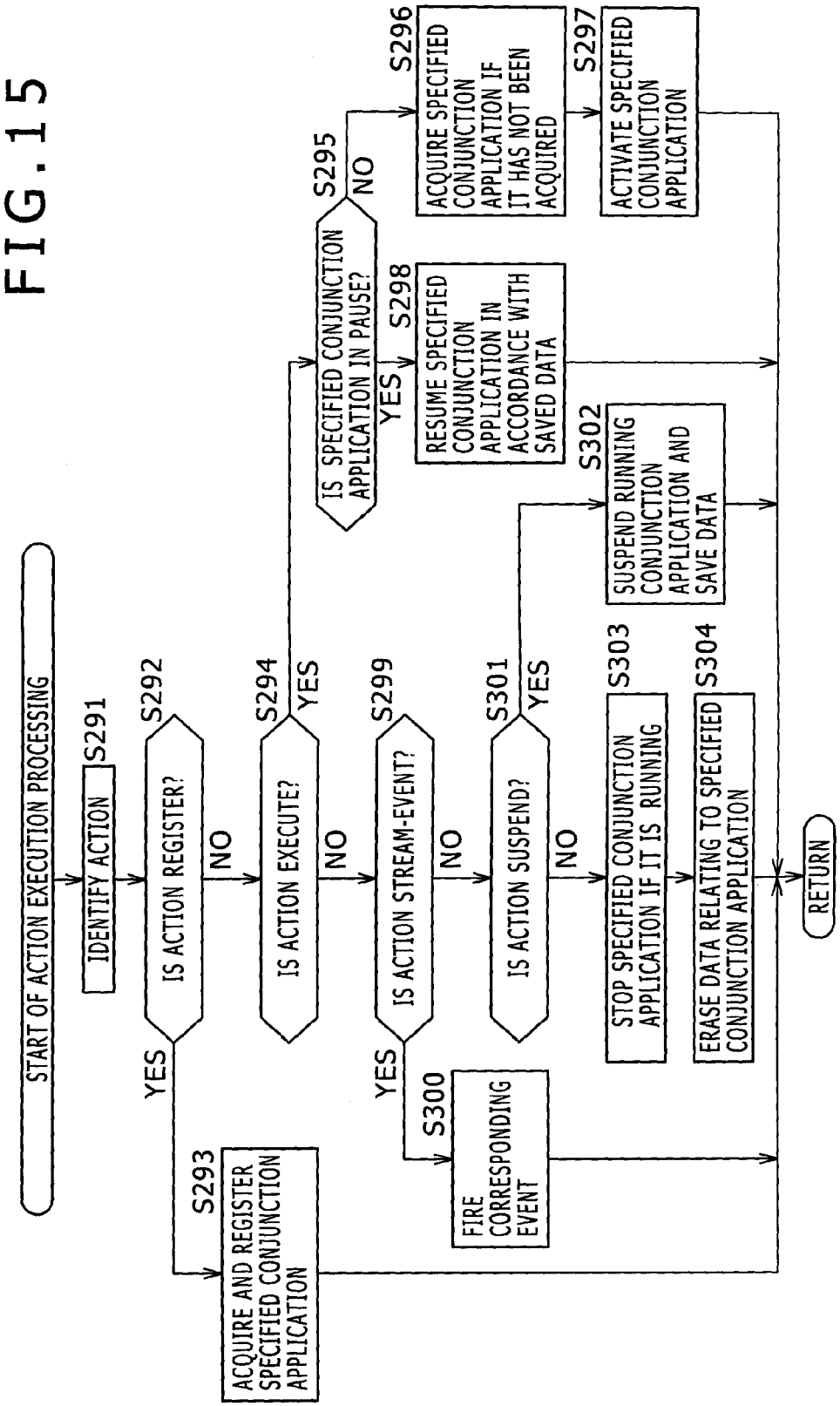
FIG. 15 is a flowchart explaining action execution processing.

Details of the action execution processing will be described later with reference to the flowchart of FIG. 15.

If the processing of the step S275 ends or it is determined in the step S276 that the event interrupt flag is set off, the processing is forwarded to a step S277.

In the step S277, the control section 221 determines whether or not a last event specified by the TPT and the AMT has been completed. If it is determined in the step S277 that the last event has not been completed, the processing returns to the step S274 and this and subsequent processing is repeated. Specifically, the processing of the steps S274 to S277 is repeated and thereby events specified by the TPT and the AMT sequentially get in the valid period, so that the operation of the conjunction application is controlled in response to actions specified by these valid events.

If it is determined in the step S277 that the last event has been completed, the processing returns to the step S271 and this and subsequent processing is repeated.

This is the end of the explanation of the conjunction application control processing.
(Action Execution Processing)

Figure 14:
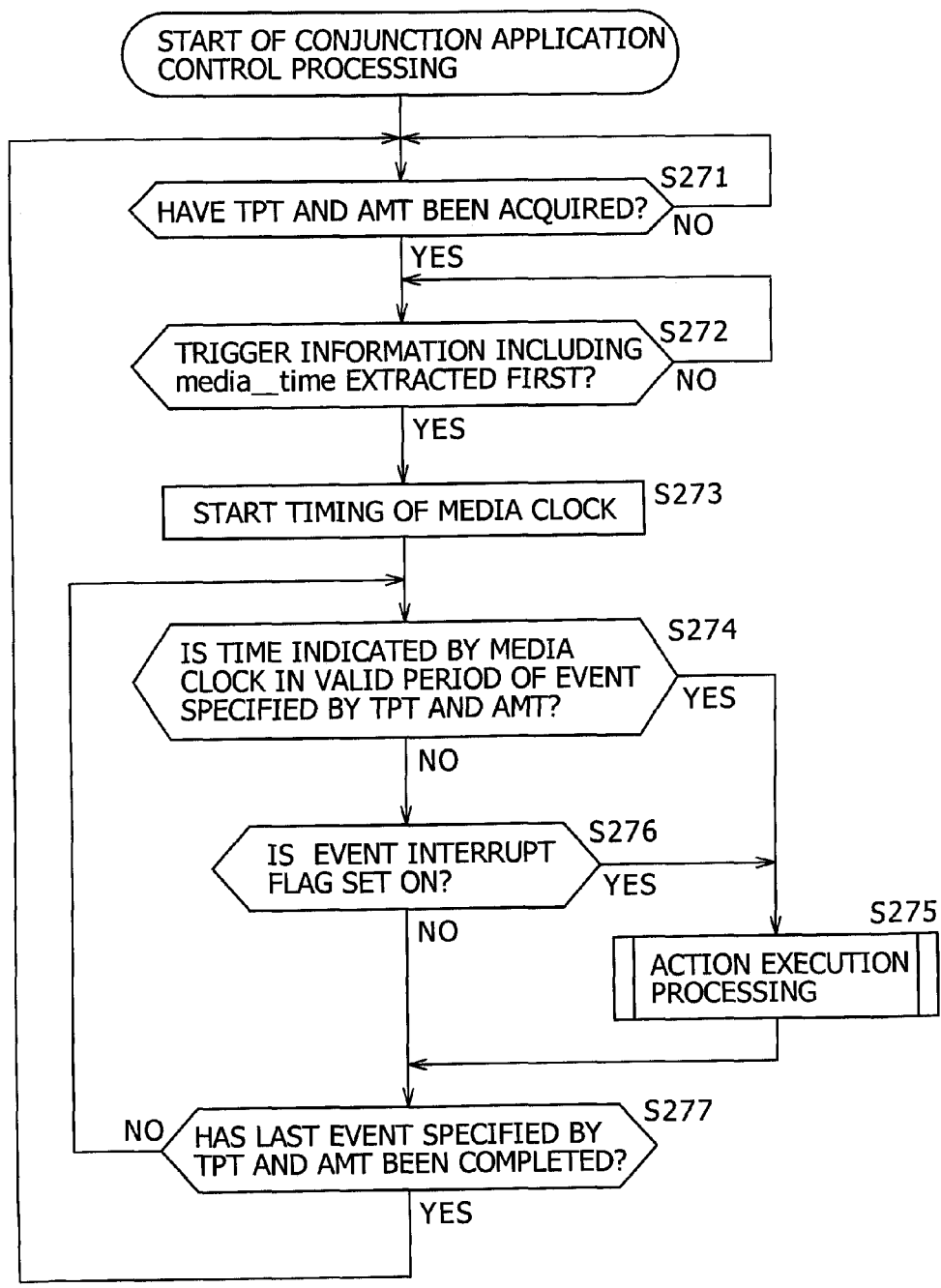
FIG. 14 is a flowchart explaining conjunction application control processing.

Next, with reference to the flowchart of FIG. 15, the action execution processing corresponding to the step S275 in FIG. 14 will be described.

In a step S291, the control section 221 identifies the action specified by the valid event. However, if the event interrupt flag is set on, the action corresponding to the event specified by event_id thereof is identified.

In a step S292, the control section 221 determines whether or not the identification result of the step S291 is the register. If it is determined to be the register, the processing is forwarded to a step S293.

In the step S293, the control section 221 controls the communication I/F 224 to access the application server 40 corresponding to the URL identified by the TPT and the AMT and make the specified conjunction application be acquired. The acquired conjunction application is retained in the cache memory 227.

In association with the acquired conjunction application, the control section 221 stores the expiration date, the use frequency, and the update frequency of this conjunction application in the memory 222. Due to this, the conjunction application retained in the cache memory 227 is managed by the control section 221 in accordance with the expiration date and a retention priority obtained from the use frequency, the update frequency, and so forth. Thereafter, the processing returns to the step S275 in FIG. 14 and the subsequent processing is repeated.

If it is determined in the step S292 that the identification result of the step S291 is not the register, the processing is forwarded to a step S294. In the step S294, the control section 221 determines whether or not the identification result of the step S291 is the execute. If it is determined to be the execute, the processing is forwarded to a step S295.

In the step S295, the control section 221 controls the application engine 226 to determine whether or not the conjunction application specified by appID is in a pause (pause state). Specifically, it is determined that the specified conjunction application is in a pause if data indicating the pause state of the specified conjunction application is saved in the save memory 228B.

If it is determined in the step S295 that the specified conjunction application is not in a pause, the processing is forwarded to a step S296. In the step S296, if the specified conjunction application has not been acquired (does not exist in the cache memory 227), the application engine 226 acquires it in accordance with control from the control section 221.

In a step S297, the application engine 226 activates the specified conjunction application in accordance with control from the control section 221. Thereafter, the processing returns to the step S275 in FIG. 14 and the subsequent processing is repeated.

If it is determined in the step S295 that the specified conjunction application is in a pause, the processing is forwarded to a step S298. In the step S298, the application engine 226 resumes the specified conjunction application in accordance with control from the control section 221.

Specifically, if the specified conjunction application is in a pause, the data in the save memory 228B is moved to the work memory 228A and the specified conjunction application is activated, thereby resuming the conjunction application in a pause from the pause state. Thereafter, the processing returns to the step S275 in FIG. 14 and the subsequent processing is repeated.

If it is determined in the step S294 that the identification result of the step S291 is not the execute, the processing is forwarded to a step S299. In the step S299, the control section 221 determines whether or not the identification result of the step S291 is the stream-event. If it is determined to be the stream-event, the processing is forwarded to a step S300.

In the step S300, the application engine 226 fires an event for the specified conjunction application in accordance with control from the control section 221. Thereafter, the processing returns to the step S275 in FIG. 14 and the subsequent processing is repeated.

If it is determined in the step S299 that the identification result of the step S291 is not the stream-event, the processing is forwarded to a step S301. In the step S301, the control section 221 determines whether or not the identification result of the step S291 is the suspend. If it is determined to be the suspend, the processing is forwarded to a step S302.

In the step S302, the application engine 226 saves data indicating the state of the conjunction application that is currently running in the save memory 228B in accordance with control from the control section 221. Thereafter, the processing returns to the step S275 in FIG. 14 and the subsequent processing is repeated.

If it is determined in the step S301 that the identification result of the step S291 is not the suspend, the identification result of the step S291 is the terminate and therefore the processing is forwarded to a step S303.

In the step S303, if the specified conjunction application is running, the application engine 226 stops it in accordance with control from the control section 221.

In a step S304, the application engine 226 erases the data relating to the specified conjunction application from the work memory 228A and the save memory 228B and erases the conjunction application from the cache memory 227 in accordance with control from the control section 221. Thereafter, the processing returns to the step S275 in FIG. 14 and the subsequent processing is repeated.

This is the end of the explanation of the action execution processing.

As described above, in the first embodiment, the TPT and the AMT are acquired and the media clock is set in response to the trigger information that is so transmitted as to be included in a broadcast signal together with AV content. Then, in a case in which the time indicated by the media clock is in the valid period of the event specified by the TPT and the AMT, or so forth, the action specified by the valid event is identified and the operation of a conjunction application is controlled in response to this action.

The update control with use of version included in the trigger information is carried out, and the TPT and the AMT are updated if the version information specified by this version is different from the version information specified by tptVersion of the TPT that has been acquired. This makes it possible to update the TPT and the AMT at arbitrary timing such as when the contents of the TPT and the AMT are desired to be changed for example. Thus, in the receiving device 20, the TPT and the AMT intended by the provider are properly retained and the conjunction application can be so operated as to be in proper conjunction with broadcast content.

<Second Embodiment>
[Configuration Example of Broadcast-Communication Cooperative System]

Figure 16:
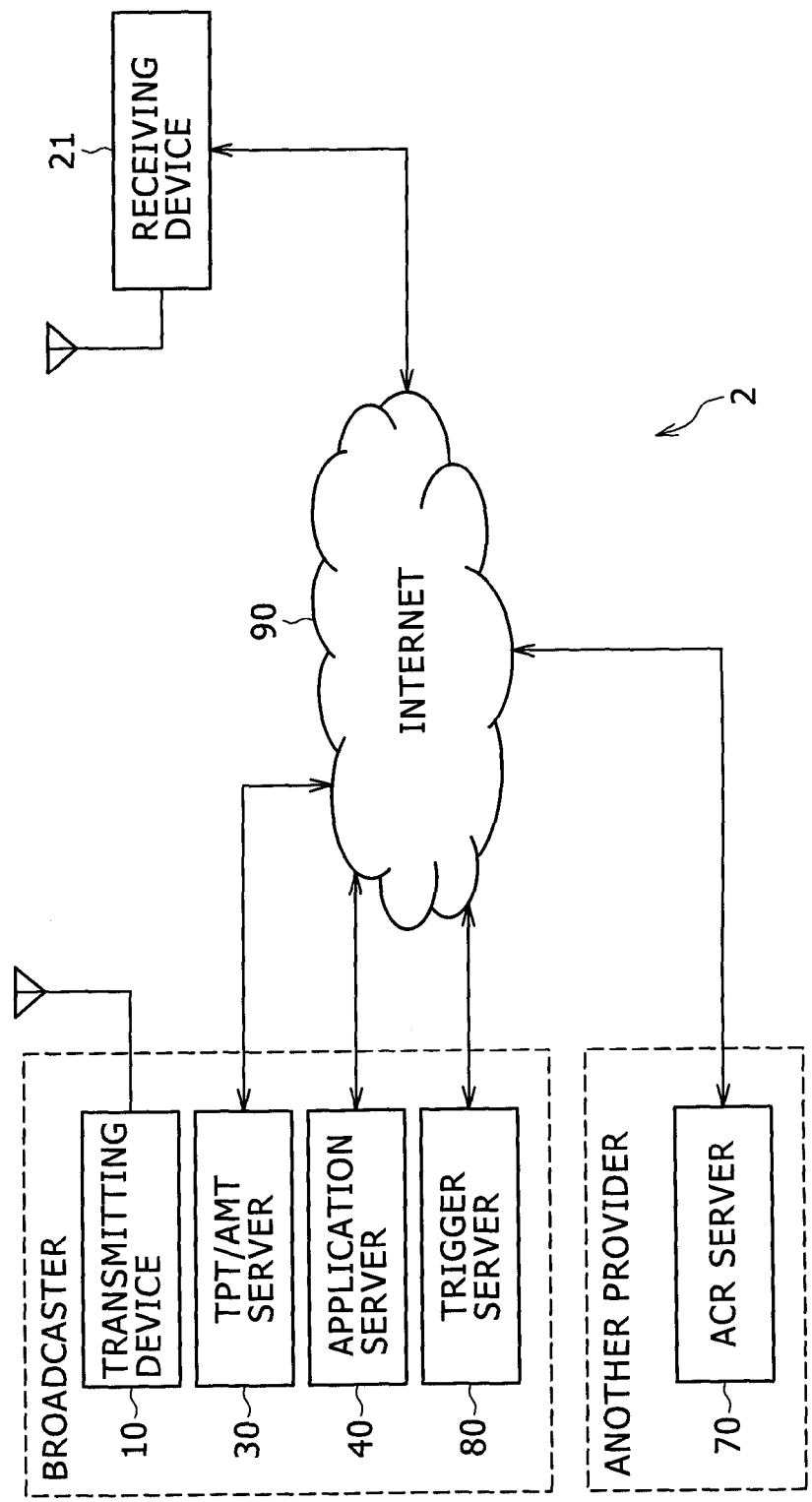
FIG. 16 is a diagram showing another configuration example of the broadcast-communication cooperative system.

FIG. 16 shows a broadcast-communication cooperative system 2 that is a second embodiment. This broadcast-communication cooperative system 2 includes the transmitting device 10, the TPT/AMT server 30, the application server 40, an ACR (automatic content recognition) server 70, a trigger server 80, and a receiving device 21.

The TPT/AMT server 30, the application server 40, the ACR server 70, the trigger server 80, and the receiving device 21 are connected to each other via the Internet 90.

That is, in the broadcast-communication cooperative system 2 of FIG. 16, compared with the broadcast-communication cooperative system 1 of FIG. 1, the ACR server 70 and the trigger server 80 are newly provided and the receiving device 21 is provided instead of the receiving device 20. The configuration other than it is the same as that in FIG. 1 and therefore description thereof is accordingly omitted.

The explanation will be made based on an assumption that, in the broadcast-communication cooperative system 2, the transmitting device 10, the TPT/AMT server 30, the application server 40, and the trigger server 80 are provided by a broadcaster whereas the ACR server 70 is provided by another provider other than the broadcaster.

The receiving device 21 periodically accesses the ACR server 70 via the Internet 90 to inquire trigger information. At this time, a feature (hereinafter, referred to also as fingerprint information (Finger Print)) extracted from either one or both of a video signal and an audio signal of broadcast content of a television show etc. is transmitted to the ACR server 70.

The ACR server 70 has a database in which the feature extracted from a video signal and an audio signal of arbitrary broadcast content is registered, and identifies broadcast content by using an ACR technique in response to a query from the arbitrary receiving device 21.

Specifically, the ACR server 70 checks fingerprint information from the receiving device 21 against the database to thereby identify broadcast content and generate trigger information depending on this identification result. In this trigger information, besides domain_name and segment_id, media_time and so forth are included. The ACR server 70 transmits the generated trigger information to the receiving device 21 via the Internet 90.

The receiving device 21 sets or resets the time specified in media_time included in the trigger information from the ACR server 70 for the media clock. The receiving device 21 accesses the TPT/AMT server 30 via the Internet 90 in accordance with the URL obtained from domain_name and segment_id included in the trigger information from the ACR server 70 to acquire TPT and AMT.

The receiving device 21 refers to the TPT and the AMT based on the media clock to thereby identify the action for the specified conjunction application. Then, the receiving device 21 controls the operation of a conjunction application in response to the identified action.

The receiving device 21 accesses the trigger server 80 via the Internet 90 based on liveTrigger described in the TPT to acquire live trigger information.

Specifically, because the URL of the trigger server 80 is specified in the liveTriggerURL attribute of the LiveTrigger element, the receiving device 21 accesses the trigger server 80 in accordance with this URL. Because information indicating a polling interval is specified in the pollPeriod attribute of the LiveTrigger element, the receiving device 21 queries the trigger server 80 about the live trigger information in accordance with this polling interval.

The trigger server 80 manages the live trigger information. The trigger server 80 transmits the live trigger information to the receiving device 21 via the Internet 90 in response to the query from the receiving device 21. In this live trigger information, besides domain_name and segmen-t_id, event_id, event_time, version, and so forth are included.

If event_id and event_time are included in the live trigger information from the trigger server 80, the receiving device 21 refers to the TPT and the AMT to identify the action corresponding to this event_id. Then, the receiving device 21 executes the identified action at the time specified by event_time to control the operation of the conjunction application.

If version is included in the live trigger information from the trigger server 80, the receiving device 21 acquires TPT and AMT from the TPT/AMT server 30 when the version information indicated by this version is different from the version information indicated by tptVersion of the TPT, thereby updating the TPT and the AMT.

Here, the reason why the trigger server 80 is provided is because it is predicted that the ACR server 70 is provided by a general provider having no relation to the broadcaster of broadcast content or so forth as described above. That is, if the trigger information is provided only by the ACR server 70 provided by the general provider, a case in which the broadcaster or so forth cannot control the trigger information is predicted.

Therefore, the broadcaster or so forth has a desire to send the trigger information to the receiving device 21 and control the operation of the conjunction application at desired timing. So, by providing the trigger server 80 and providing the live trigger information controlled by the broadcaster to the receiving device 21, the conjunction application can be so operated as to be in proper conjunction with broadcast content.

In the broadcast-communication cooperative system 2, the transmitting device 10 does not need to transmit the trigger information because the trigger information is generated by the ACR server 70.

The broadcast-communication cooperative system 2 is configured in the above-described manner.

[Configuration Example of Receiving Device]

Figure 17:
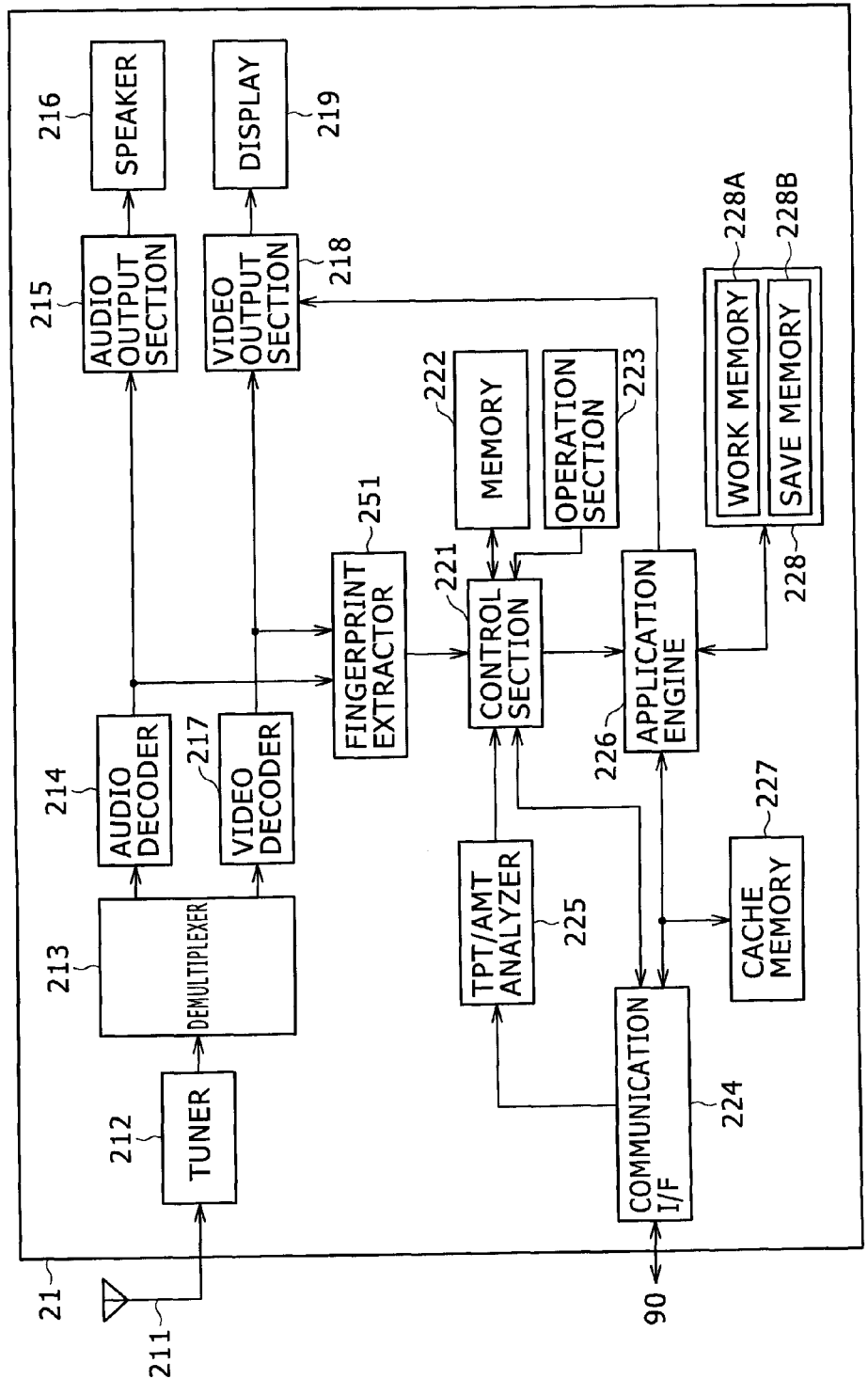
FIG. 17 is a diagram showing another configuration example of the receiving device.

FIG. 17 shows a configuration example of the receiving device 21 in FIG. 16.

The receiving device 21 has the components from the tuner 212 to the application memory 228 similarly to the receiving device 20 of FIG. 3 but is different compared with the receiving device 20 of FIG. 3 in that a fingerprint extractor 251 is provided instead of the trigger information extractor 220. In the receiving device 21, the same places as those in the receiving device 20 of FIG. 3 are given the same symbols and description thereof is accordingly omitted.

To the fingerprint extractor 251, an audio signal from the audio decoder 214 and a video signal from the video decoder 217 are supplied. The fingerprint extractor 251 extracts a feature from either one or both of the audio signal and the video signal and supplies it as fingerprint information to the control section 221.

The communication I/F 224 transmits the fingerprint information to the ACR server 70 via the Internet 90 in accordance with control from the control section 221. The communication I/F 224 receives trigger information transmitted from the ACR server 70 and supplies it to the control section 221.

In response to the trigger information supplied from the communication I/F 224, the control section 221 controls the communication I/F 224 to access the TPT/AMT server 30 via the Internet 90 and request TPT and AMT. The communication I/F 224 receives the TPT and the AMT transmitted from the TPT/AMT server 30 via the Internet 90 and supplies them to the TPT/AMT analyzer 225. Due to this, the TPT/AMT analyzer 225 retains the TPT and the AMT and supplies the retained TPT and AMT in response to a request from the control section 221.

The control section 221 sets or resets the media clock based on the trigger information from the communication I/F 224.

The control section 221 identifies the action for the specified conjunction application based on the analysis result of the TPT and the AMT from the TPT/AMT analyzer 225 and the time indicated by the media clock. For example, when a predetermined valid condition is satisfied, such as when the time indicated by the media clock first reaches the valid period of an event, the control section 221 identifies the action corresponding to this valid event.

In response to the identified action, the control section 221 controls the application engine 226 to control the operation of the conjunction application.

The communication I/F 224 accesses the trigger server 80 to receive live trigger information and supply it to the control section 221 in accordance with control from the control section 221.

If an ID adapted to identify an event for the specified conjunction application is included in the live trigger information from the trigger server 80, the control section 221 refers to the analysis result of the TPT and the AMT and identifies the action that corresponds to this ID and is for the conjunction application.

The receiving device 21 is configured in the above-described manner.

In the receiving device 21, the trigger information response processing (FIG. 12) and the conjunction application control processing (FIG. 14) are executed similarly to the receiving device 20. However, the receiving device 21 is different in that the trigger information is acquired from the ACR server 70 or the trigger server 80 instead of being delivered by a broadcast. Therefore, the configuration other than this is the same as that explained with reference to the flowcharts of FIG. 11 to FIG. 15 and thus description thereof is omitted.

As described above, in the second embodiment, the TPT and the AMT are acquired and the media clock is set in response to the trigger information acquired from the ACR server 70. In the case in which the time indicated by the media clock is in the valid period of the event specified by the TPT and the AMT, or so forth, the action specified by the valid event is identified and the operation of a conjunction application is controlled in response to this action.

The update control with use of version included in the trigger information acquired from the trigger server 80 is carried out, and the TPT and the AMT are updated if the version information specified by this version is different from the version information specified by tptVersion of the TPT that has been acquired. This makes it possible to update the TPT and the AMT at arbitrary timing such as when the contents of the TPT and the AMT are desired to be changed for example. Thus, in the receiving device 21, the TPT and the AMT intended by the provider are properly retained and the conjunction application can be so operated as to be in proper conjunction with broadcast content.

The conjunction application is not limited to the case in which it is run in conjunction with broadcast content. For example, it is also possible for the conjunction application to be run in conjunction with AV content such as communication content delivered based on VOD (video on demand) via the Internet 90.

In the above description, it is explained that the conjunction application is delivered by the Internet. However, the conjunction application is not limited to the Internet delivery and may be so transmitted as to be included in a broadcast signal by the transmitting device 10. In this case, the receiving device 20 acquires the conjunction application from the transmitting device 10 and controls the operation thereof in response to an identified action.

In the above description, it is explained that the operation of the conjunction application is controlled by using the TPT and the AMT. However, it is also possible for the receiving device 20 to control the operation of the conjunction application without acquiring the TPT and the AMT. In this case, the receiving device 20 controls the operation of the conjunction application in response to the trigger information from the transmitting device 10.

In the above description, it is explained that the TPT and the AMT are delivered by the Internet. However, they are not limited to the Internet delivery and may be so transmitted as to be included in a broadcast signal by the transmitting device 10. In this case, the receiving device 20 acquires the TPT and the AMT multiplexed in a transport stream of a broadcast signal and controls the operation of the conjunction application by using them.

[Explanation of Computer to Which Embodiments of Present Disclosure Are Applied]

The above-described series of processing can be executed by hardware and can also be executed by software. In a case of executing the series of processing by software, a program configuring the software is installed in a computer. Here, in the computer, a computer incorporated in dedicated hardware, e.g. a general-purpose personal computer capable of carrying out various kinds of functions through installation of various kinds of programs, and so forth are included.

FIG. 18 is a diagram showing a configuration example of the hardware of the computer that executes the above-described series of processing by a program.

In a computer 900, a CPU (central processing unit) 901, a ROM (read only memory) 902, and a RAM (random access memory) 903 are connected to each other by a bus 904.

An input/output interface 905 is connected to the bus 904. To the input/output interface 905, an input block 906, an output block 907, a recording block 908, a communication block 909, and a drive 910 are connected.

The input block 906 includes a keyboard, mouse, microphone, etc. The output block 907 includes a display, speaker, etc. The recording block 908 includes a hard disc, non-volatile memory, etc. The communication block 909 includes a network interface etc. The drive 910 drives removable media 911 such as an optical disc or a semiconductor memory.

In the computer 900 configured in the above-described manner, the CPU 901 loads a program stored in the recording block 908 into the RAM 903 via the input/output interface 905 and the bus 904 and runs it for example, and thereby the above-described series of processing is executed.

The program run by the computer 900 (CPU 901) can be recorded in the removable media 911 as package media or so forth and be provided for example. The program can be provided via a wired or wireless transmission medium such as a local area network, the Internet, or a digital satellite broadcast.

In the computer 900, the program can be installed into the recording block 908 via the input/output interface 905 by loading the removable media 911 in the drive 910. The program can be received by the communication block 909 via a wired or wireless transmission medium and be installed into the recording block 908. The program can be installed in the ROM 902 or the recording block 908 in advance.

The program run by the computer 900 may be a program processed in a time-series manner along the order explained in the present specification or may be a program processed in parallel or at a necessary timing such as when calling is performed.

Here, in the present specification, the processing steps that describe the program adapted to make the computer 900 execute various kinds of processing do not necessarily need to be processed in a time-series manner along the order described as the flowcharts and include also processing executed in parallel or individually (e.g. parallel processing or processing by an object).

The program may be one processed by computer or may be subjected to dispersion processing by plural computers. The program may be transferred to a distant computer to be run.

In the present specification, a system means a collection of plural constituent elements (devices, modules (parts), etc.) and is irrespective of whether or not all constituent elements exist in a same chassis. Therefore, both of plural devices that are housed in separate chassis and are connected via a network and one device in which plural modules are housed in one chassis are a system.

Embodiments of the present disclosure are not limited to the above-described embodiments and various changes are possible in such a range as not to depart from the gist of the present disclosure.

For example, the present disclosure can employ a configuration of cloud computing to process one function by plural devices via a network in a sharing and cooperative manner.

The respective steps explained in the above-described flowcharts can be carried out by plural devices in a sharing manner besides being carried out by one device.

If plural kinds of processing are included in one step, the plural kinds of processing included in this one step can be executed by plural devices in a sharing manner besides being carried out by one device.

The present disclosure can employ following configurations.

(1)

A receiving device including:

a receiver that receives AV content;

a trigger information acquirer that acquires trigger information adapted to identify control information to control operation of an application program run in conjunction with the AV content;

a table acquirer that acquires a table in which the control information identified by the trigger information is stored in response to first version information that is included in the trigger information and indicates a version of the table; and a control section that controls the operation of the application program in response to the control information that is identified by the trigger information and is stored in the table.

(2)

The receiving device according to (1), in which second version information indicating the version of the table is stored in the table, and the table acquirer acquires the table if the first version information included in the trigger information is different from the second version information stored in the table.

(3)

The receiving device according to (1) or (2), in which the trigger information is transmitted by a broadcast together with the AV content, the table is delivered via a network, the trigger information acquirer extracts the trigger information from data of the AV content, and the table acquirer acquires the table delivered via the network.

(4)

The receiving device according to (1) or (2), in which the AV content is transmitted by a broadcast, the table is delivered via a network, the receiving device further includes a feature extractor that extracts a feature from data of the AV content, the trigger information acquirer acquires the trigger information corresponding to an identification result of the AV content identified by using the feature, and the table acquirer acquires the table delivered via the network.

(5)

The receiving device according to any of (1) to (4), in which an action indicating the operation of the application program is associated with time at which the action should be executed in the table, and the control section controls the operation of the application program in response to the action identified from the table based on time information included in the trigger information.

(6)

A receiving method of a receiving device, the method executed by the receiving device, including:

receiving AV content;

acquiring trigger information adapted to identify control information to control operation of an application program run in conjunction with the AV content;

acquiring a table in which the control information identified by the trigger information is stored in response to first version information that is included in the trigger information and indicates a version of the table; and controlling the operation of the application program in response to the control information that is identified by the trigger information and is stored in the table.

(7)

A transmitting device including:

a trigger information generator that generates trigger information that is adapted to identify control information to control operation of an application program run in conjunction with AV content and includes version information indicating a version of a table in which the control information identified by the trigger information is stored; and a transmitter that transmits the trigger information together with the AV content.

(8)

A transmitting method of a transmitting device, the method executed by the transmitting device, including:

generating trigger information that is adapted to identify control information to control operation of an application program run in conjunction with AV content and includes version information indicating a version of a table in which the control information identified by the trigger information is stored; and transmitting the trigger information together with the AV content.

What is claimed is:

1. A receiving device comprising:
a receiver; and
circuitry configured to
receive audio/video content;
acquire first control information adapted to identify application control information to control operation of an application run in conjunction with the audio/video content;
acquire a first table in which the application control information identified by the first control information is stored, the first table including an identifier associated with a specific segment of the audio/video content;
acquire a second table when first version information that is included second control information indicates a newer version of the first table, the first table being separate from the second table, the second table including the identifier associated with the specific segment of the audio/video content and included in the first table; and
control the operation of the application in response to the application control information that is identified by the first control information and is stored in the first table.

2. The receiving device according to claim 1,
wherein second version information indicating the version of the first table is stored in the first table, and
the circuitry acquires the second table when the first version information included in the second control information is different from the second version information stored in the first table.

3. The receiving device according to claim 2,
wherein the first and control information are transmitted by a broadcast together with the audio/video content,
the first and second tables are delivered via a network, and the circuitry is configured to
extract the first and second control information from data of the audio/video content, and
acquire the first and second tables delivered via the network.

4. The receiving device according to claim 2,
wherein the audio/video content is transmitted by a broadcast,
the first and second tables are delivered via a network,
the circuitry is configured to
extract a feature from data of the audio/video content,
acquire the first and second control information corresponding to an identification result of the audio/video content identified by using the feature, and
acquire the first and second tables delivered via the network.

5. The receiving device according to claim 1,
wherein an action in the first table indicating the operation of the application is associated with a time at which the action should be executed, and
the circuitry is configured to control the operation of the application in response to the action identified from the first table based on time information included in the first control information.

6. The receiving device according to claim 1,
wherein the second control information includes an identifier of the first table.

7. The receiving device according to claim 1, wherein the circuitry is configured to
acquire the first and the second control information from a digital television broadcast signal that includes the audio/video content, and
acquire the first and second tables from a computer network.

8. The receiving device according to claim 1,
wherein the second table includes timing information for at least one event included in the first table.

9. A receiving method of a receiving device, the method executed by the receiving device, comprising:
receiving audio/video content;
acquiring first control information adapted to identify application control information to control operation of an application run in conjunction with the audio/video content;
acquiring, by circuitry of a reception apparatus, a first table in which the application control information identified by the first control information is stored, the first table including an identifier associated with a specific segment of the audio/video content;
acquire a second table when first version information that is included in second control information indicates a newer version of the first table, the first table being separate from the second table, the second table including the identifier associated with the specific segment of the audio/video content and included in the first table; and
controlling, by the circuitry, the operation of the application in response to the application control information that is identified by the first control information and is stored in the first table.

10. A transmitting device comprising:
a transmitter; and
circuitry configured to
generate first control information that is adapted to identify application control information to control operation of an application run in conjunction with audio/video content and includes first version information indicating a version of a first table in which the application control information identified by the first control information is stored; and
transmit the first control information together with the audio/video content, wherein
the first control information causes a reception apparatus that receives the first control information to acquire a first table in which the application control information identified by the first control information is stored, the first table including an identifier associated with a specific segment of the audio/video content, and
second control information causes the reception apparatus to acquire a second table when second version information that is included in the second control information indicates a newer version of the first table, the first table being separate from the second table, the second table including the identifier associated with the specific segment of the audio/video content and included in the first table.

11. A transmitting method of a transmitting device, the method executed by the transmitting device, comprising:
generating, by processing circuitry of the transmitting device, first control information that is adapted to identify application control information to control operation of an application run in conjunction with audio/video content and includes first version information indicating a version of a first table in which the application control information identified by the first control information is stored; and
transmitting, by a transmitter of the transmitting device, the first control information together with the audio/video content, wherein
the first control information causes a reception apparatus that receives the first control information to acquire a first table in which the application control information identified by the first control information is stored, the first table including an identifier associated with a specific segment of the audio/video content, and
second control information causes the reception apparatus to acquire a second table when second version information that is included in the second control information indicates a newer version of the first table, the first table being separate from the second table, the second table including the identifier associated with the specific segment of the audio/video content and included in the first table.

* * * * *